(12) United States Patent
Ramachandran et al.

(10) Patent No.: US 12,437,200 B2
(45) Date of Patent: *Oct. 7, 2025

(54) ACCELERATING NEURAL NETWORKS WITH ONE SHOT SKIP LAYER PRUNING

(71) Applicant: Advanced Micro Devices, Inc., Santa Clara, CA (US)

(72) Inventors: Arun Coimbatore Ramachandran, Bangalore (IN); Chandra Kumar Ramasamy, Bangalore (IN); Prakash Sathyanath Raghavendra, Bangalore (IN); Keerthan Subraya Shagrithaya, Bengaluru (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/345,445

(22) Filed: Jun. 30, 2023

(65) Prior Publication Data

US 2023/0351187 A1 Nov. 2, 2023

Related U.S. Application Data

(63) Continuation of application No. 16/457,550, filed on Jun. 28, 2019, now Pat. No. 11,694,081.

(60) Provisional application No. 62/848,259, filed on May 15, 2019.

(51) Int. Cl.
*G06N 3/082* (2023.01)
*G06F 9/345* (2018.01)
*G06F 18/214* (2023.01)
*G06N 3/04* (2023.01)

(52) U.S. Cl.
CPC ........... *G06N 3/082* (2013.01); *G06F 9/3455* (2013.01); *G06F 18/214* (2023.01); *G06N 3/0418* (2013.01)

(58) Field of Classification Search
None
See application file for complete search history.

(56) References Cited

PUBLICATIONS

Guo, Jia, and Miodrag Potkonjak. "Pruning filters and classes: Towards on-device customization of convolutional neural networks." Proceedings of the 1st International Workshop on Deep Learning for Mobile Systems and Applications. 2017. (Year: 2017).*
He, Yang, et al. "Soft filter pruning for accelerating deep convolutional neural networks." arXiv preprint arXiv:1808.06866 (2018). (Year: 2018).*

(Continued)

*Primary Examiner* — Eric Nilsson
(74) *Attorney, Agent, or Firm* — Volpe Koenig

(57) ABSTRACT

Systems, methods, and devices for pruning a convolutional neural network (CNN). A subset of layers of the CNN is chosen, and for each layer of the subset of layers, how salient each filter in the layer is to an output of the CNN is determined, a subset of the filters in the layer is determined based on the salience of each filter in the layer, and the subset of filters in the layer is pruned. In some implementations, the layers of the subset of layers of the CNN are non-contiguous. In some implementations, the subset of layers includes odd numbered layers of the CNN and excludes even numbered layers of the CNN. In some implementations, the subset of layers includes even numbered layers of the CNN and excludes odd numbered layers of the CNN.

18 Claims, 17 Drawing Sheets

(56) References Cited

PUBLICATIONS

Luo, Jian-Hao, Jianxin Wu, and Weiyao Lin. "Thinet: A filter level pruning method for deep neural network compression." Proceedings of the IEEE international conference on computer vision. 2017. (Year: 2017).*

Minnehan, Breton, and Andreas Savakis. "Cascaded projection: End-to-end network compression and acceleration." Proceedings of the IEEE/CVF Conference on Computer Vision and Pattern Recognition. 2019. (Year: 2019).*

Rosenfeld, Amir et al., "Intriguing properties of randomly weighted networks: Generalizing while learning next to nothing." 2019 16th Conference on Computer and Robot Vision (CRV), IEEE 2019.

Lin et al., "Accelerating Convolutional Networks via Global & Dynamic Filter Pruning." IJCAI, vol. 2, No. 7, 2018.

Chen et al., "Shallowing deep networks: Layer-wise pruning based on feature presentations." IEEE transactions on pattern analysis and machine intelligence 41. 12 (2018): 3048-3056.

Li et al., "Pruning filters for efficient convnets." arXiv e-prints: 1608.08710v3 (2017).

Siam et al., "A comparative study of real-time semantic segmentation for autonomous driving." Proceedings of the IEEE conference on computer vision and pattern recognition workshops. 2018.

He et al., "Soft filter pruning for accelerating deep convolutional neural networks". arXiv preprint arXiv: 1808.06866 (2018).

Luo et al., "Thinet: pruning cnn filters for a thinner net." IEEE transactions on pattern analysis and machine intelligence 41.10 (2018): 2525-2538.

Pan et al., "Shallow and deep convolutional networks for saliency prediction." Proceedings of IEEE conference on computer vision and pattern recognition 2016.

Luo, Jian-Hao et al., "ThiNet: A Filter Level Pruning Method for Deep Neural Network Compression", 9 pgs., Jul. 20, 2017 (downloaded from https://arxiv.org/abs/1707.06342).

Hinton, Geoffrey, et al., "Distilling the Knowledge in a Neural Network", 9 pgs., Mar. 9, 2015 (downloaded from https://arxiv.org/abs/1503.02531).

Han, Song et al., "Learning both Weights and Connections for Efficient Neural Networks", Proceedings of the 28th International Conference on Neural Information Processing Systems, vol. 1, pp. 1135-1143, Montreal, Canada, Dec. 7-12, 2015.

Zeiler, Matthew D. et al., "Visualizing and Understanding Convolutional Networks", 11 pgs., Nov. 28, 2013, (downloaded from https://arxiv.org/abs/1311.2901).

Iandola, Forrest N. et al., "SqueezeNet: AlexNet-Level Accuracy with 50x Fewer Parameters and <0.5MB Model Size", 13 pgs., Nov. 4, 2016 (downloaded from https://arxiv.org/abs/1602.07360).

Zhang, Xiangyu et al., "Accelerating Very Deep Convolutional Networks for Classification and Detection", 14 pgs., Nov. 18, 2015 (downloaded from https://arxiv.org/abs/1505.06798?context=cs).

Huang, Gao et al., "Densely Connected Convolutional Networks", 9 pgs., Jan. 28, 2018 (downloaded from https://arxiv.org/abs/1608.06993).

He, Yang et al., "Progressive Deep Neural Networks Acceleration via Soft Filter Pruning", 11 pgs., Mar. 9, 2019 (downloaded from https://arxiv.org/abs/1808.07471).

He, Kaiming et al., "Deep Residual Learning for Image Recognition", 2016 IEEE Conference on Computer Vision and Pattern Recognition, 9 pgs., Las Vegas, NV, USA, Jun. 27-30, 2016.

Wen, Wei et al., "Learning Structured Sparsity in Deep Neural Networks", 10 pgs., Oct. 18, 2016 (downloaded from https://arxiv.org/abs/1608.03665).

Lin, Min et al., "Network in Network", 10 pgs., Mar. 4, 2014 (dowloaded from https://arxiv.org/abs/1312.4400).

Liu, Baoyuan et al., "Sparse Convolutional Neural Networks", 2015 IEEE Conference on Computer Vision and Pattern Recognition, 9 pgs., IEEE, Boston, MA, Jun. 7-12, 2015 (downloaded from https://www.cv-foundation.org/openaccess/content_cvpr_2015/papers/Liu_Sparse_Convolutional_Neural_2015_CVPR_paper.pdf).

Lavin, Andrew, et al., "Fast Algorithms for Convolutional Neural Networks", 9 pgs., Nov. 10, 2015 (downloaded from https://arxiv.org/abs/1509.09308).

Hu, Hengyuan et al., "Network Trimming: A Data-Driven Neuron Pruning Approach Towards Efficient Deep Architectures", 9 pgs., Jul. 12, 2016 (downloaded from https://arxiv.org/abs/1607.03250).

Han, Song et al., "Deep Compression: Compressing Deep Neural Networks with Pruning, Trained Quantization and Huffman Coding", 14 pgs., Feb. 15, 2016 (downloaded from https://arxiv.org/abs/1510.00149).

Denil, Misha et al., "Predicting Parameters in Deep Learning", 9 pgs., Oct. 27, 2014 (downloaded from https://arxiv.org/abs/1306.0543).

Everingham, Mark et al., "The PASCAL Visual Object Classes (VOC) Challenge", International Journal of Computer Vision, vol. 88, Issue 2, pp. 303-338, Kluwer Academic Publishers, Hingham, MA, Jun. 2010 (downloaded from host.robots.ox.ac.uk/pascal/VOC/pubs/everingham10.pdf).

Farabet, Clement et al., "Large-Scale FPGA-based Convolutional Networks", Machine Learning on Very Large Data Sets, 26 pgs., Cambridge University Press, May 2, 2011 (downloaded from http://yann.lecun.com/exdb/publis/pdf/farabet-suml-11.pdf).

Goodfellow, Ian J., et al., "Maxout Networks", 9 pgs., Sep. 20, 2013 (downloaded from https://arxiv.org/pdf/1302.4389.pdf).

Lucas, Simon M., "ICDAR 2005 Text Locating Competition Results", Eighth International Conference on Document Analysis and Recognition, 5 pgs., IEEE, Seoul, South Korea, Aug. 31-Sep. 1, 2005 (downloaded from https://www.researchgate.net/publication/4214766_ICDAR_2005_text_locating_competition_results).

Zhang, Yuting, et al., "Augmenting Supervised Neural Networks with Unsupervised Objectives for Large-scale Image Classification", 17 pgs., Jun. 21, 2016 (downloaded from https://arxiv.org/abs/1606.06582).

Cun, Yann Le, et al., "Optimal Brain Damage" in Advances in Neural Information Processing Systems 2, pp. 598-605, 1990 (downloaded from yann.lecun.com/exdb/publis/pdf/lecun-90b.pdf).

Targ, Sasha, et al., "Resnet in Resnet: Generalizing Residual Architectures", 7 pgs., Mar. 25, 2016 (downloaded from https://arxiv.org/abs/1603.08029).

Hu, Yiming, et al., "A Novel Channel Pruning Method for Deep Neural Network Compression", 10 pgs., May 29, 2018 (downloaded from https://arxiv.org/abs/1805.11394).

He, Yihui, et al., "Channel Pruning for Accelerating Very Deep Neural Networks", 10 pgs., Aug. 21, 2017 (downloaded from https://arxiv.org/abs/1707.06168).

Anwar, Sajid, et al., "Structured Pruning of Deep Convolutional Neural Networks", ACM Journal on Emerging Technologies in Computing Systems (JETC)—Special Issue on Hardware and Algorithms for Learning On-a-chip and Special Issue on Alternative Computing Systems, 11 pgs., vol. 13, Issue 3, Article No. 32, ACM, New York, NY, May 2017.

Jaderberg, Max, et al., "Speeding up Convolutional Neural Networks with Low Rank Expansions", 12 pgs., May 15, 2014 (downloaded from https://arxiv.org/abs/1405.3866).

* cited by examiner

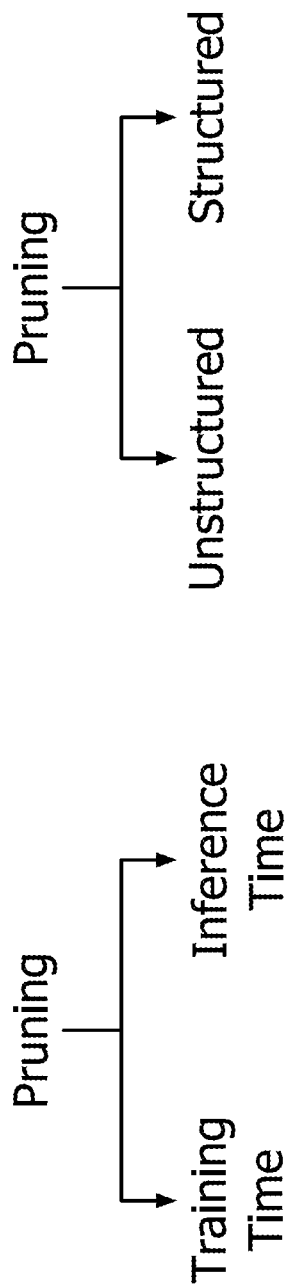
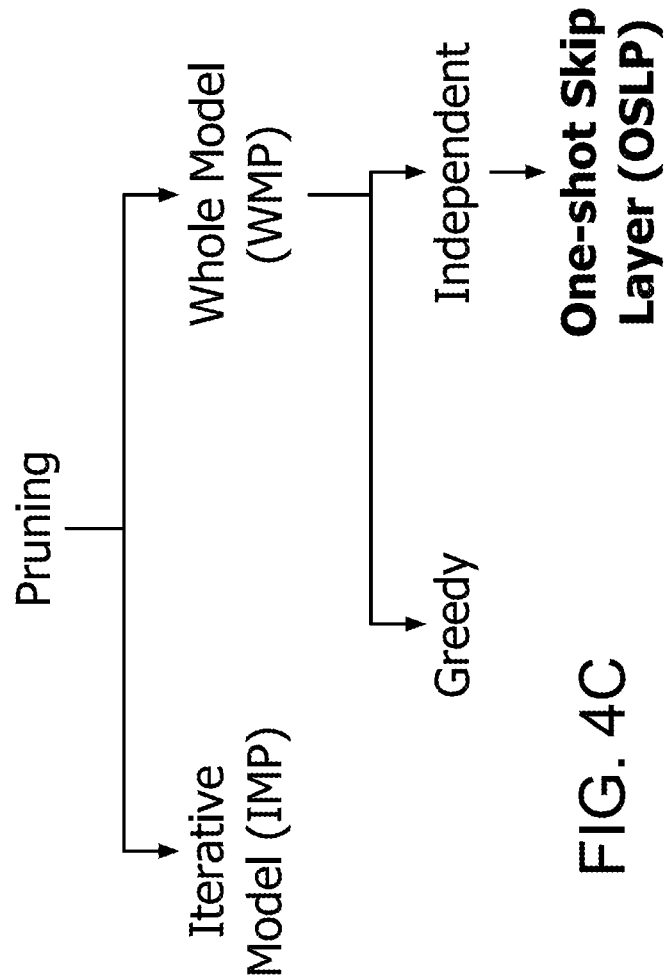
FIG. 4A
FIG. 4B
FIG. 4C

ACCELERATING NEURAL NETWORKS WITH ONE SHOT SKIP LAYER PRUNING

CROSS REFERENCE TO RELATED APPLICATIONS

This application is a continuation of U.S. patent application Ser. No. 16/457,550, filed on Jun. 28, 2019, which claims the benefit of U.S. Provisional Application No. 62/848,259, filed on May 15, 2019, which are incorporated by reference as if fully set forth herein.

BACKGROUND

An artificial neural network (ANN) is a computing device or system inspired by the way biological nervous systems, such as brains, process information. An ANN includes an interconnected group of nodes (i.e., artificial neurons). The nodes are interconnected by links, sometimes referred to as synapses in this context. Each node can receive input data, perform operations on the data, and pass the results on to other nodes. The output of a node can be referred to as its activation, or node value. Each of the links is associated with a weight. The ANN can be trained by inputting a training data set, a known correct output, to generate an output inference. The output inference can be compared to the known correct input, and the difference, if any, can be used to adjust the weights. This procedure can be performed iteratively to converge on an optimized weighting for the ANN based on that training data set. After the ANN is trained, it can draw inferences based on input data, within a degree of confidence that is based upon the training of the ANN.

Convolutional neural networks (CNN) are a class of ANN, typically applied to image analysis, and which typically include convolution and pooling functions, among others. CNNs have emerged as a solution for various real time problems in vision, speech, and so forth.

BRIEF DESCRIPTION OF THE DRAWINGS

A more detailed understanding can be had from the following description, given by way of example in conjunction with the accompanying drawings wherein:

FIG. 4A, is a tree diagram illustrating example approaches to pruning;

FIG. 4B is a tree diagram illustrating example categories of pruning;

FIG. 4C is a tree diagram illustrating example methods of pruning;

DETAILED DESCRIPTION

Figure 1:
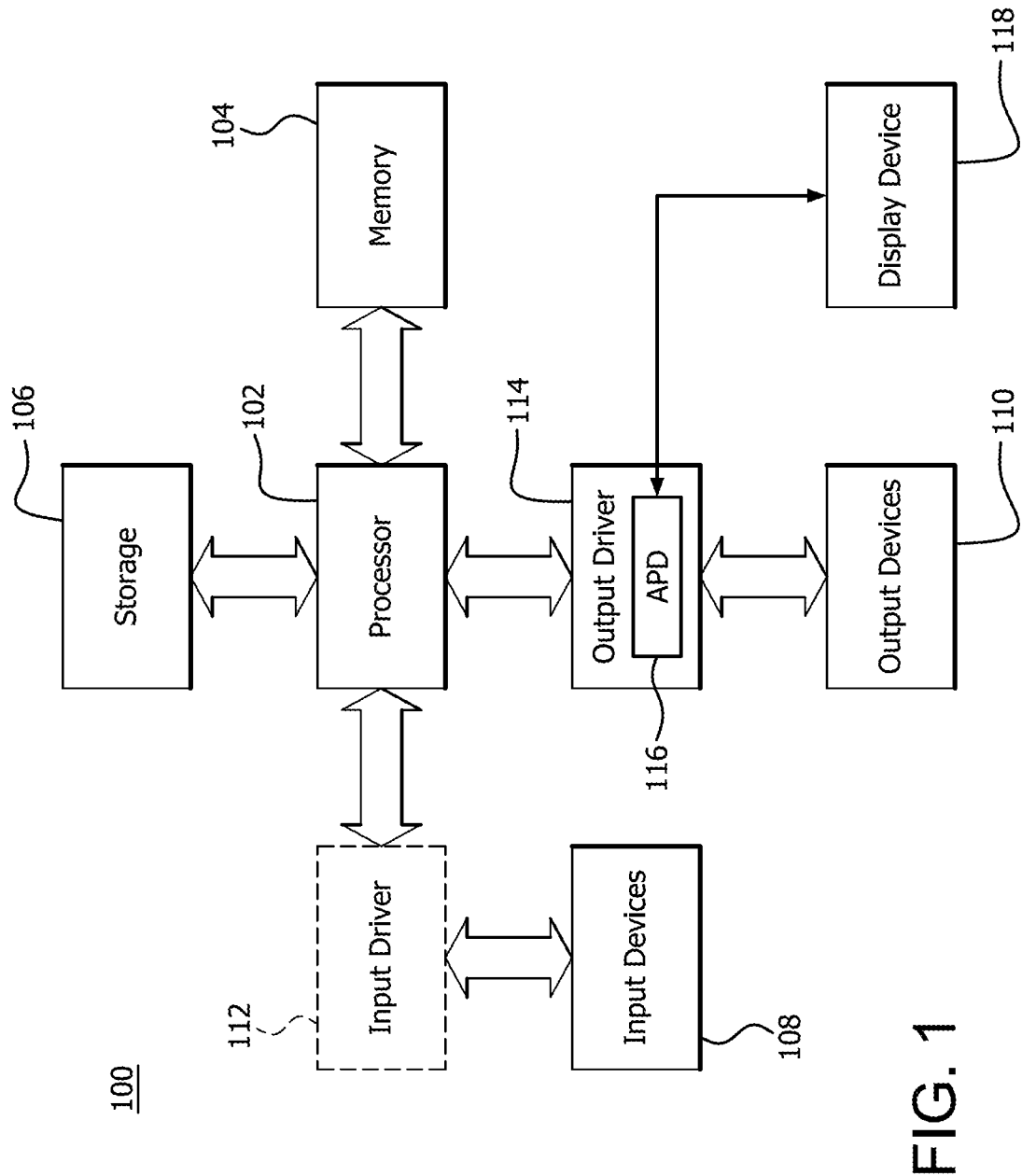
FIG. 1 is a block diagram of an example device in which one or more features of the disclosure can be implemented.

Some implementations provide a method for pruning a convolutional neural network (CNN). The method includes choosing a subset of layers of the CNN, and for each layer of the subset of layers: determining how salient each filter in the layer is to an output of the CNN, determining a subset of the filters in the layer based on the salience of each filter in the layer, and pruning the subset of filters in the layer.

In some implementations, the layers of the subset of layers of the CNN are non-contiguous. In some implementations, the subset of layers includes odd numbered layers of the CNN and excludes even numbered layers of the CNN. In some implementations, the subset of layers includes even numbered layers of the CNN and excludes odd numbered layers of the CNN. In some implementations, the subset of layers includes selecting a first layer of the CNN, skipping a stride number of layers, and selecting a second layer of the CNN following the skipped layers. In some implementations, determining the salience includes L2-norm ensembling. In some implementations, determining the subset of filters in the layer based on the salience of each filter in the layer includes selecting filters with the lowest salience based on a pruning threshold. In some implementations, the pruning threshold percent ($T_{OSLP}$) is calculated based on a given Whole Model Pruning (WMP) independent pruning threshold ($T_{WMPind}$). In some implementations, the pruning threshold is greater than a corresponding WMP independent pruning threshold. In some implementations, the salience to the output of the CNN of each filter includes a salience to an output of the layer of that filter.

Some implementations provide a computing device configured to prune a convolutional neural network (CNN). The computing device includes circuitry to choose a subset of layers of the CNN, and for each layer of the subset of layers: determining how salient each filter in the layer is to an output of the CNN, determine a subset of the filters in the layer based on the salience of each filter in the layer, and prune the subset of filters in the layer.

In some implementations, the layers of the subset of layers of the CNN are non-contiguous. In some implementations, the subset of layers includes odd numbered layers of the CNN and excludes even numbered layers of the CNN. In some implementations, the subset of layers includes even numbered layers of the CNN and excludes odd numbered layers of the CNN. In some implementations, the subset of layers includes selecting a first layer of the CNN, skipping a stride number of layers, and selecting a second layer of the CNN following the skipped layers. In some implementations, the salience includes L2-norm ensembling. In some implementations, the subset of filters in the layer based on the salience of each filter in the layer includes selecting filters with the lowest salience based on a pruning threshold. In some implementations, the pruning threshold percent ($T_{OSLP}$) is calculated based on a given WMP independent pruning threshold ($T_{WMPind}$). In some implementations, the pruning threshold is greater than a corresponding WMP independent pruning threshold. In some implementations, the salience to the output of the CNN of each filter includes a salience to an output of the layer of that filter.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
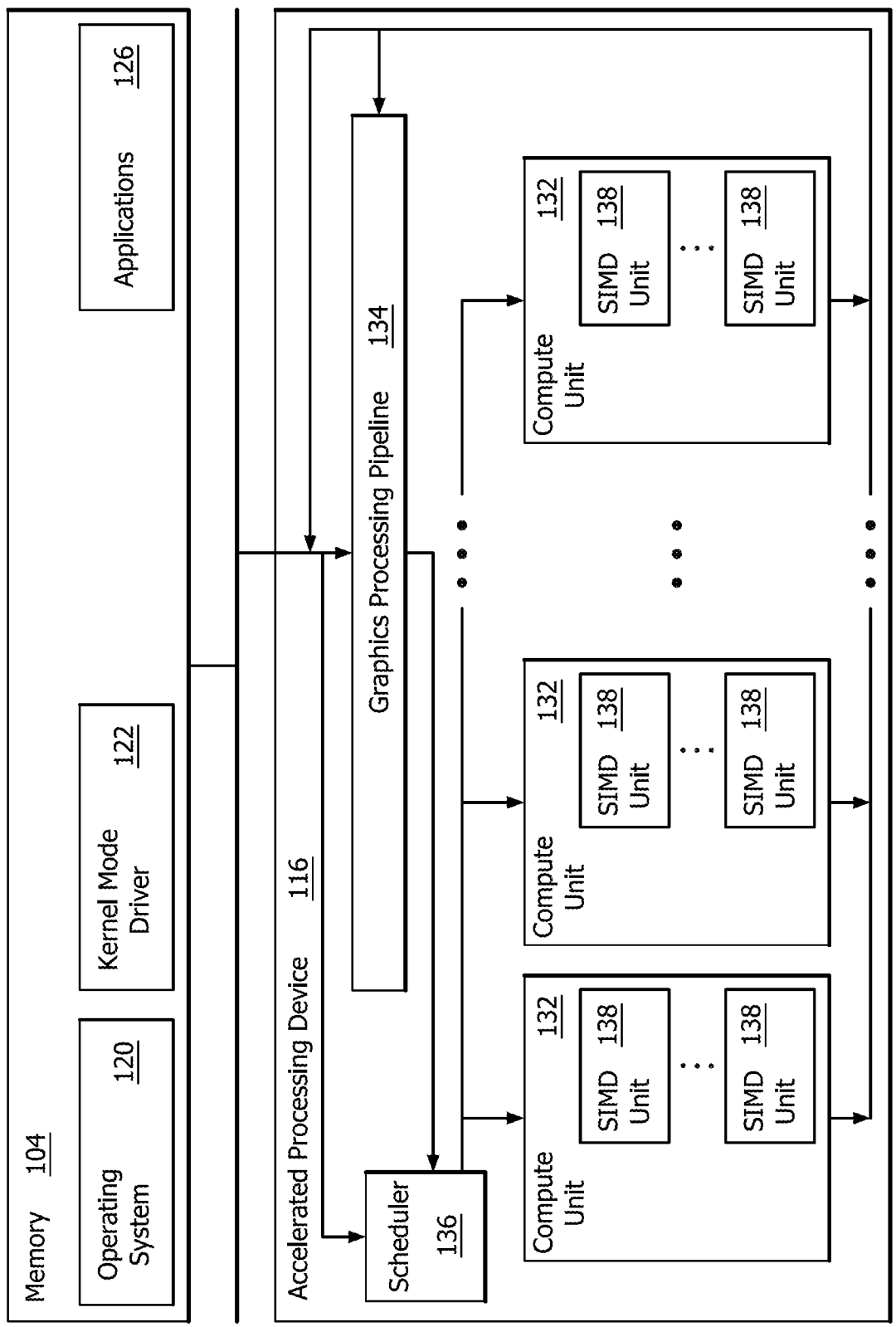
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
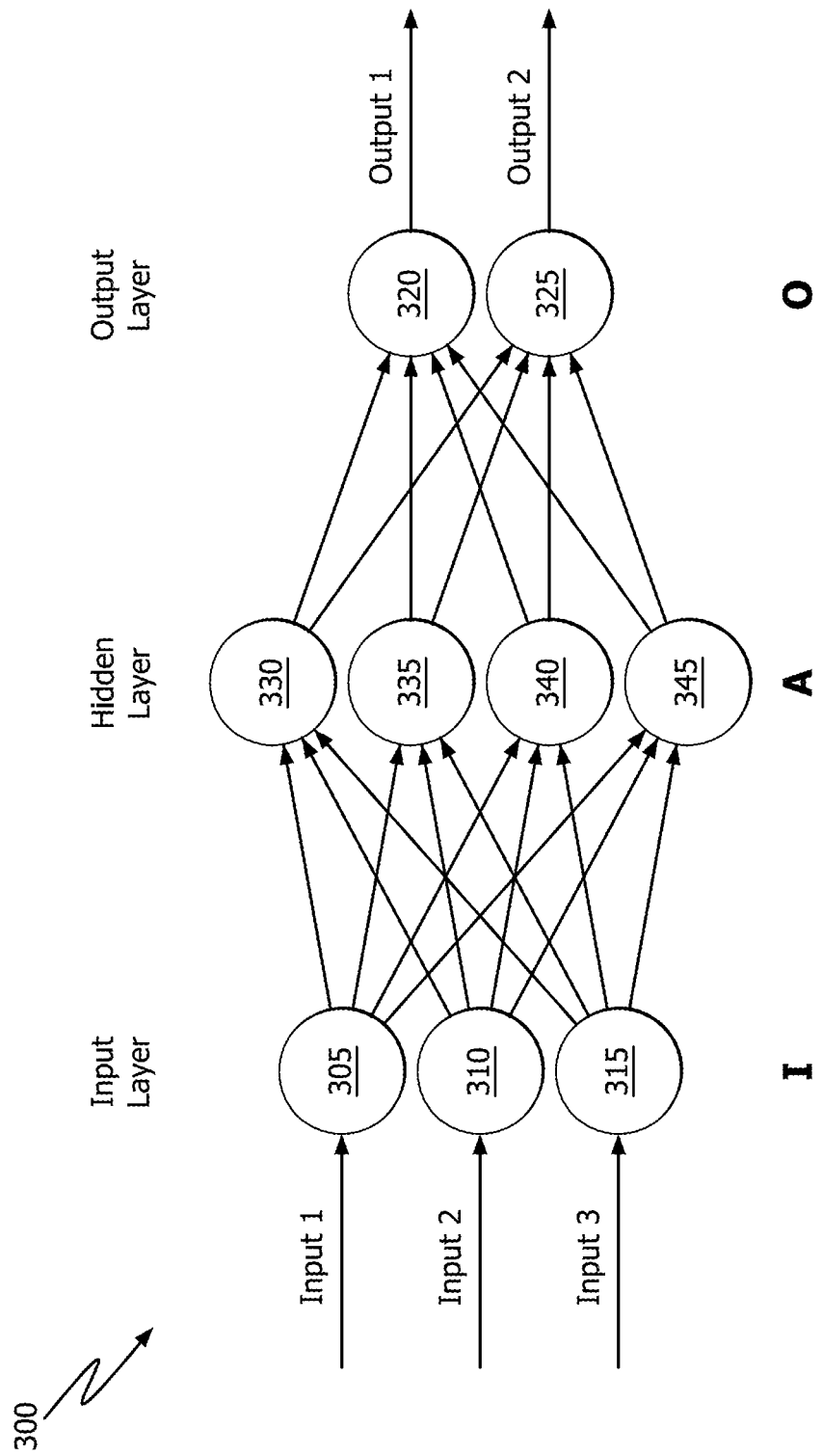
FIG. 3 is a schematic diagram illustrating an example CNN.

FIG. 3 is a schematic diagram illustrating an example CNN 300. CNN 300 includes a plurality of nodes such as input nodes 305, 310, 315 output nodes 320, 325, and hidden nodes 330, 335, 340, 345. CNN 300 is described generally as a CNN; however, this description also broadly illustrates an ANN.

Example CNN 300 is organized into layers, including an input layer I, an output layer O, and a hidden (i.e., not input or output) layer A. Input layer I includes input nodes 305, 310, 315. Output layer O includes output nodes 320, 325. Hidden layer A includes hidden nodes 330, 335, 340, 345. In this context, describing a node or layer as hidden means that it is both input to and output from only by other nodes of the CNN, unlike input nodes and output nodes, which have a regular input or output interface with components outside of the CNN. A layer which outputs to or inputs from another layer can be described as logically adjacent to that layer. For example, in CNN 300, hidden layer A can be described as logically adjacent to input layer I and to output layer O. Logical adjacency in this context neither requires nor excludes physical adjacency.

The input, output, and hidden layers are interconnected by various links as shown in FIG. 3. In the example of CNN 300 each node shares a link with each node in its logically adjacent layers (i.e., is fully connected). The topology of CNN 300 is only one example, and it is noted that an CNN can be arranged in any suitable topology. For example, an CNN may instead include a different number of hidden layers, different numbers of input and/or output nodes, and/or different numbers and/or arrangements of links. CNN 300 is shown as having only one hidden layer, however the techniques described herein can also be applied to deep neural networks (i.e., having more than one hidden layer). It is noted that in other CNNs, each node need not share a link with each node in its logically adjacent layers (i.e., may not be fully connected).

Each of the hidden nodes of CNN 300 receives data from one or more preceding (i.e., closer to the input layer) nodes in a logically adjacent layer via a link, and outputs data to one or more succeeding (i.e., closer to the output layer) nodes in a logically adjacent layer via a link. For example, hidden node 330 inputs data from each of input nodes 305, 310, 315 via corresponding links, and outputs data to each of output nodes 320, 325 via corresponding links.

Each node processes its input data according to a function, which can be referred to as an activation function of the node. Each of the links is associated with a weight by which the data passing over that link is weighted (e.g., multiplied) before it is input to the activation function. For example, the data input to hidden node 330 is weighted according to the link weight of each corresponding input link from input nodes 305, 310, 315. Thus, if the link weight of the link from input node 305 is other than 1, the data will be modified based on the link weight before it is processed by the activation function of hidden node 330. If the link weight of the link from input node 310 differs from the link weight of the link from input node 305, the data from each of the input nodes will be weighted differently before it is processed by the activation function of hidden node 320. Similarly, the data output from hidden node 330 to each of output nodes 320, 325 of output layer O is weighted according to each corresponding output link. In some implementations (e.g., image processing) the link weight of each input link to a node is expressed as a vector or matrix of weights. For example, in some implementations the input weights for a node that inputs a square grid of 9 pixels is expressed as a 3×3 matrix. In some implementations, the vector or matrix of weights is referred to as a filter (e.g., a 3×3 filter, 5×5 filter, 7×7 filter, etc.). In some examples, filters are implemented as an instance of a kernel executing on a processor (e.g., a GPU). For example, if hidden nodes 330 and 335 each include a 5×5 filter, each of the filters is an instance of the same 5×5 filter kernel. Similarly, if hidden nodes 340 and 345 each include a 7×7 filter, each of the filters is an instance of the same 7×7 filter kernel.

Hidden node 330 processes the data input from input nodes 305, 310, 315, as weighted by the corresponding link weights or filters, according to its activation function to generate output data. This output data from hidden node 320 is in turn input by output nodes 320, 325 of output layer O, as weighted by the link weights or filters associated with the corresponding links. Based on the activation functions of each of the nodes and the link weights or filters of each of the links in CNN 300, an output is generated at output nodes 320, 325 based on data input to input nodes 305, 310, 315.

The optimal size of a CNN, or the optimal number of parameters required for a particular task for the network is not known in some cases. Accordingly, CNNs are often implemented as larger networks and/or with a greater number of parameters than may otherwise be optimal, in order to achieve a desired level of accuracy. Accordingly, CNNs are often computationally and memory intensive, which has an effect on both performance and power requirements.

CNN power and performance needs can be handled in various ways. For example, neural network compression is used in some cases to reduce neural network size, which in some implementations, reduces computational complexity and memory bandwidth requirements. Pruning is a neural network compression technique that reduces the neural network size by removing certain parameters from the CNN. In some implementations, the parameters that are pruned include insignificant and/or redundant parameters.

FIGS. 4A, 4B, and 4C illustrate various approaches to pruning, categories of pruning, and methods for pruning, respectively. For example, pruning can be performed at training time or at inference time as shown in FIG. 4A.

Training based pruning is costly (e.g., relative to inference based pruning in terms of number of epochs required) and does not generalize well (e.g., in terms of restoring accuracy on validation) for deeper networks. Accordingly, inference time pruning is preferable in some implementations.

Figure 5:
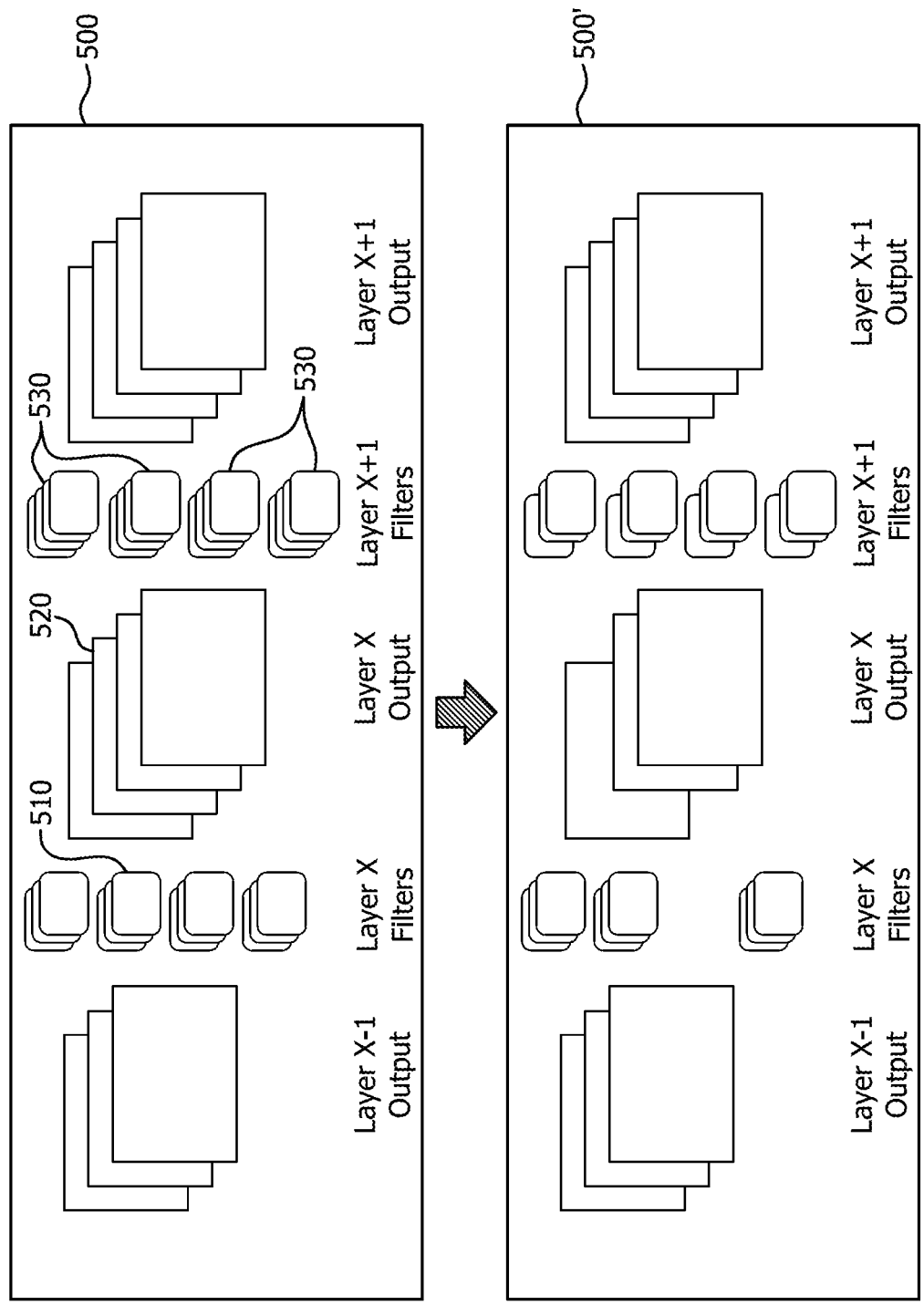
FIG. 5 is a schematic diagram illustrating example structure pruning.

Pruning can be unstructured or structured, as shown in FIG. 4B. Unstructured pruning induces sparsity in filters by removing only certain dimensions of a filter. For example, unstructured pruning may prune the channel output of a filter without completely pruning the corresponding kernel height, kernel width, or channel input of the filter. This requires specific hardware support for efficient computation in some implementations. Structured pruning involves removing complete structures, such as kernels, filters, and so forth, from the CNN. Structured pruning does not alter the overall network architecture and does not require specific hardware or tool chain modifications for it to be exploited for efficient computation. FIG. 5 is a schematic diagram illustrating an example CNN 500, and example CNN 500'. CNN 500' represents example CNN 500 after pruning of filters 510 of layer X of CNN 500, output 520 of layer X of CNN 500, and filters 530 of layer X+1 of CNN 500, as an example of structure pruning.

As shown in FIG. 4C, a CNN can be pruned layer-by-layer using an Iterative Model Pruning (IMP) approach, or all layers can be pruned at once in a Whole Model Pruning (WMP) approach.

In IMP approaches, a network model is pruned one layer at a time. In some implementations, after each layer is pruned, the model is fine-tuned. This is because in some cases, pruning a layer leads to information loss and degradation of the accuracy of the CNN. Fine-tuning in this context refers to adjusting the weights of the unpruned filters to regain the accuracy (or some of the accuracy) of the CNN. In IMP, pruning of initial layers (i.e., layers closer to the input of the CNN) requires fewer epochs of fine-tuning, whereas pruning of deeper layers (i.e., layers closer to the output of the CNN) require more epochs of fine-tuning. In some implementations, IMP is cumbersome for deeper models where the number of fine-tuning epochs required to regain the accuracy (or an acceptable degree of accuracy) is unacceptably high.

In WMP approaches, all the layers of a network model are pruned at the same time, and the pruned model is fine-tuned (e.g., as a final step) to regain the accuracy (or some of the accuracy) of the CNN. FIG. 4C shows two WMP strategies; i.e., greedy pruning and independent pruning.

In WMP greedy strategies, layers are pruned sequentially, taking the pruning of previous layers into account. In other words, filters pruned in a layer x dictate which filters are pruned in layer x+1. The model is fine-tuned after all layers are pruned. WMP greedy strategies analyze filter sensitivity, using training data samples, to determine the number of filters that can be removed. Pruning of each layer is followed by an error recovery phase. The error recovery phase re-initializes weights of the pruned layer. The sequential procedure, the need for training samples, and multiple error recovery phases, make WMP Greedy strategies inefficient in some implementations.

In WMP independent strategies, a layer is pruned independently of other layers (i.e., the pruning does not take the pruning of previous layers into account). WMP independent strategies are simpler than WMP greedy strategies in they do not include filter sensitivity analysis based on training data samples, and do not include error recovery phases for each pruned layer. On the other hand, regaining the accuracy after pruning is difficult for WMP independent strategies (e.g., because they do not include an error recovery phase after pruning each layer).

Accordingly, it may be desired to provide a CNN pruning strategy that converges faster and scales well for different models.

Some implementations include a One-shot Skip Layer Pruning (OSLP) approach to achieve faster convergence and scalability as compared with the other approaches discussed above. In terms of the illustration in FIGS. 1A, 1B, and 1C, OSLP is an inference time structured WMP independent filter pruning method which introduces skip layers and selection of filters to be removed by ensembling L2 Norms of filters from the layer being pruned and the immediate next skipped layer. Ensembling is a machine learning technique where different weights are given to different machine learning models, and a combination of these weights improve prediction. Experimentally, OSLP strategies achieve convergence (i.e., achieving a trained CNN with a threshold accuracy) similar to WMP greedy strategies while being as simple as WMP independent strategies (e.g., in that OSLP strategies do not include an error recovery phase after pruning each layer). Further, in some implementations, OSLP is relatively easy to implement and scales well for deeper networks.

OSLP is an inference based, structured, WMP, independent, filter pruning method, as illustrated in FIG. 4C. As discussed earlier, some IMP and WMP greedy implementations are time and compute intensive, and implementation changes require guidance by users with skilled expertise in relevant frameworks and tools. Accordingly, it is difficult to implement real-time applications using IMP and WMP greedy methods. On the other hand, some WMP independent methods are simple and easy to implement, however, their performance is not on par with either IMP or WMP greedy methods. Accordingly, some OSLP implementations provide pruning which achieves CNN inference time, latency, and/or throughput after pruning on par with WMP greedy pruning while retaining the simplicity and ease of realization of WMP independent pruning, In some implementations, OSLP provides for ease of deployment, reduced pruning overhead, faster convergence, and high performance with respect to the state of the art, and provides scalability across different CNN models (e.g., VGGnet16, Densenet, Resnet, etc.) For example, in some implementations, OSLP provides good performance for both dense and sparse CNNs.

OSLP methods differ from generic pruning algorithms in various ways, including the use of skip layers and/or L2-norm ensemble pruning criteria. For example, some OSLP implementations include determining non-contiguous layers to be pruned. These non-contiguous layers are referred to as "skip layers."

Some OSLP implementations include filter pruning, where the pruning criteria with which filters to be pruned are selected is based on L2-norm ensembling. Table 1 illustrates, using pseudocode, an example OSLP pruning algorithm. Steps 1 and 4 include skip layers and L2-norm ensembling respectively.

TABLE 1

1: Choose M non-contiguous layers
2: for all M layers do
3:    for all filters do
4:       score = scoring function (filter)
5:    end for
6:    CNN = retain top m filters(score)
7: end for
8: Fine-tune model for q epochs In step 1, the layers to be pruned are identified. These layers are non-contiguous skip layers.

The algorithm acts on each of the chosen skip layers in the do loop defined by steps 2 and 7.

Within each chosen skip layer, the algorithm performs L2-norm ensembling on each of the filters in the layer in the do loop defined by steps 3 and 5. The L2-norm ensembling is used in step 4 as a pruning criterion to provide a saliency score for each of the filters of the skip layer being pruned. The term saliency score is used, for ease of description in the examples herein, to indicate whether or not the filter contributes significantly to the output of the layer, and/or the amount or degree to which it contributes to the output of the layer. In some implementations, this is not expressed as a score, and is expressed and/or calculated in any other suitable way.

In step 6, the m filters of the skip layer being pruned which have the highest saliency score (as determined in step 4) are retained, and the rest are pruned. In this example, m is the number of filters to be retained. This could be expressed as a percentage or in another suitable way in other implementations. In any case, a value of m which regains a suitable accuracy level after retraining is determined. The value of m is determined heuristically in this example, although in other implementations m is determined in any suitable way. In other implementations, m is determined in any suitable way.

After all of the skip layers are pruned (i.e., after the outside do loop ends at step 7), the pruned model is "fine-tuned" over a fixed number of epochs q. In some implementations, the fixed number of epochs q is determined based on convergence (i.e., a point beyond which accuracy does not improve). For example, in some implementations using OSLP, a value of q resulting in sufficient recovery of the original accuracy of the CNN is equal to (or approximately equal to) 1/10 the total number of epochs required for training.

Figure 6B:
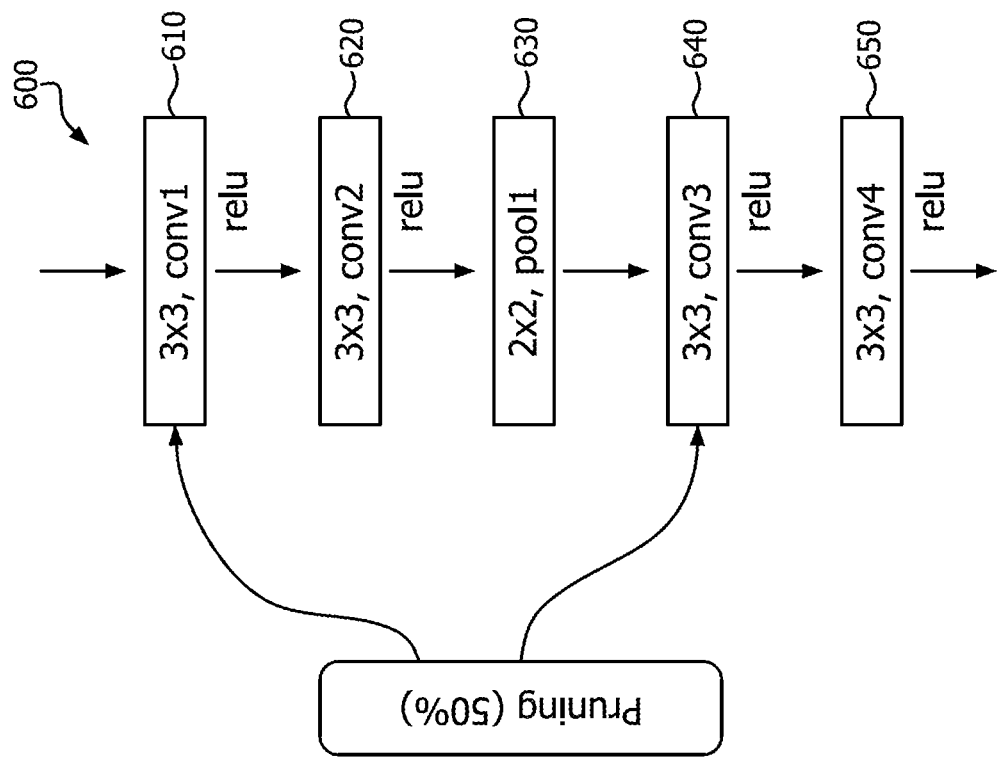
FIG. 6B is a schematic diagram illustrating an example of one-shot skip layer pruning (OSLP)
Figure 6A:
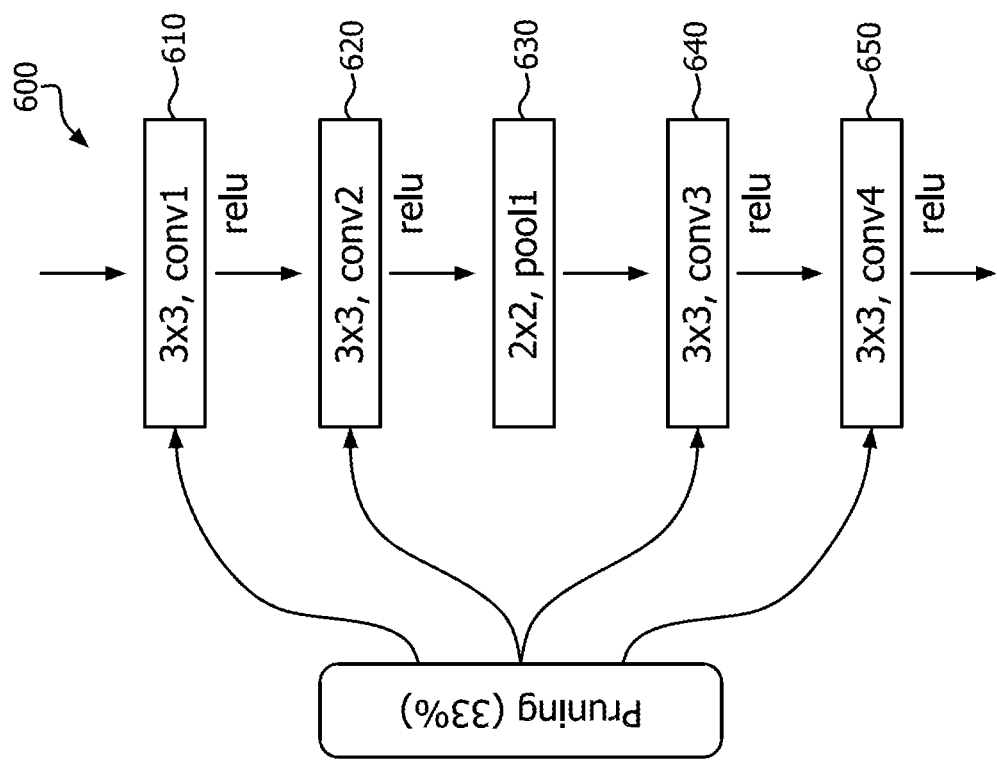
FIG. 6A is a schematic diagram illustrating a typical WMP independent pruning.

FIG. 6A is a schematic diagram illustrating a typical WMP independent pruning, which shows a portion of an example CNN 600. The portion of CNN 600 shown includes convolutional layers 610, 620, 630, and 640 respectively, and includes a pooling layer 650. The portion of CNN 600 is pruned using a WMP independent approach in the example of FIG. 6A, where each of the convolutional layers 610, 620, 630, and 640 is pruned independently of the others. Here, each convolutional layer is pruned at a 31% threshold. In other words, the top 69% of filters, in terms of impact on the output of the layer, are retained in each convolutional layer, and the remaining 31% of filters are removed or "pruned".

FIG. 6B is a schematic diagram illustrating OSLP pruning, which shows the same portion of example CNN 600 as shown and described with respect to FIG. 6B. The portion of CNN 600 is pruned using a WMP independent approach in the example of FIG. 6A, where certain non-adjacent convolutional layers (610 and 640 in this example) are pruned independently. Here, each convolutional layer is pruned at a 50% threshold. In other words, the top 50% of filters, in terms of impact on the output of the layer, are retained in each convolutional layer, and the remaining 50% of filters are removed or "pruned".

As shown in FIG. 6B, skip layer filter pruning describes methods where filter pruning is bypassed or otherwise not performed for at least one convolutional layer immediately following a layer that is pruned.

For example, if a first convolution layer 'x' is pruned, at least layer 'x+1' (if x+1 is a convolution layer) will be skipped for filter pruning in skip layer filter pruning methods. OSLP can also be referred to as non-contiguous layer pruning. In some implementations, non-contiguous layer pruning has the advantage of avoiding loss of information, inducing less error in accuracy as compared with contiguous layer pruning.

In OSLP methods, the layers to be pruned are each identified with one or more following skip layers. The number of skip layers following each layer to be pruned can be one, or more than one, depending on the complexity of the model. For example, sparse models such as VGGNet16 may require one skip layer while dense models like DenseNet121 may require two skip layers.

Layer selection begins from shallow layers to deep layers. In other words, layer selection proceeds from the input to the output of the CNN. In some implementations, this is because shallower layers contribute more to FLOPs reduction than deeper layers, and because deeper layers are highly sensitive to pruning. Shallow layers here refer to the lower layers and deep layers refer to the upper layers of a network.

In some implementations, an example process for selecting layers to be pruned can be formulated as a problem of identifying layers contributing to maximum FLOPs reduction.

For example, in a CNN with N convolutional layers, numbered 1:::N, let $f_i$ denote the number of FLOPS required for convolution layer i. Since the number of clock cycles for multiplication is exponentially larger than addition, $f_i$ is approximated as $f_i \approx M$, where M is the number of multiplication operations only.

Given $k_i$ as the filter height and width, $c_i$ as the number of input channels, $h_i$ as the height of the input volume, $w_i$ as the width of the input volume, and di as the number of filters or output depth:

$$f_i = (k_i^2 c_i)((h_i - k_i + 1)(w_i - k_i + 1))d_i \qquad \text{Eq. 1}$$

Equation 1 can be rewritten as $$f_i = \eta_i c_i d_i \qquad \text{Eq. 2}$$

where, $$\eta_i k_i^2 (h_i - k_i + 1)(w_i - k_i + 1) \qquad \text{Eq. 3}$$

Let the sequence of depths be denoted by $D = \{d_1, d_2, d_N\}$. Let $\eta_i$ be defined as $\eta_i = \{\eta_2, \ldots \eta_n\}$. Then Equation 2 can be rewritten as:

$$f_i = \eta_i d_{i-1} d_i \qquad \text{Eq. 4}$$

Let the pruning threshold be T<1. Since a structured pruning algorithm is used, insignificant or redundant filters are removed, thus decreasing output depth d. This reduces the FLOPS in current layer and its next layer, as shown below.

$$f'_i = \eta_i d_{i-1}(d_i(1-T)) = f_i(1-T) \qquad \text{Eq. 5}$$

$$f'_{i+1} = \eta_{i+1}(d_i(1-T))d_{i+1} = f_{i+1}(1-T) \qquad \text{Eq. 6}$$

Let b be a vector of length N consisting of 1s and 0s representing the layer selection status. The vector b should be updated for optimal selection of layers to get maximum FLOPs reduction for the given threshold T. Skip value S specifies the number of skip layers and n as a constraint on the number of layers being pruned for the given skip value S. The layer selection can thus be formulated as, $$b^* = \text{argmax}_b(\Sigma_{i=1}^{i=N} b_i \{f_i f_{i+1} - f'_i f'_{i+1}\}) \qquad \text{Eq. 7}$$

subject to, $$\Sigma_{j=i}^{j=i+S} b_j = 1 \qquad \text{Eq. 8}$$

$$\Sigma_{i=1}^{i=N} b_j = n \qquad \text{Eq. 9}$$

Using Equations 5 and 6, Equation 7 can be written as, $$b^* = \text{argmax}_b(\Sigma_{i=1}^{i=N} b_i T\{f_i f_{i+1}\}) \qquad \text{Eq. 10}$$

Equation 10 provides the layer selection for the given pruning threshold and skip value.

To illustrate comparative error accumulation between contiguous and non-contiguous layer pruning, in one example, filter pruning is performed on various sets of 5 layers of VGGNet16. VGGNet16 is a popular CNN model used for image classification. VGGNet16 is used here for the sake of example, however any suitable CNN model can be used. The layers identified for pruning are either contiguous or non-contiguous, resulting in filter pruning for both contiguous and non-contiguous layer selections. In this example, contiguous layer pruning is performed on combinations of layers (1, 2, 3, 4, 5), (3, 4, 5, 6, 7), and (5, 6, 7, 8, 9) and non-contiguous layer pruning is performed on layers (1, 3, 5, 7, 9).

Figure 7:
FIG. 7 is a bar graph illustrating the accumulation of error in a CNN after pruning example combinations of contiguous and non-contiguous convolutional layers of a CNN.

FIG. 7 is a bar graph illustrating the accumulation of percentage error in the CNN after pruning for the contiguous and non-contiguous layer combinations. As shown in FIG. 7, the error induced by pruning is less in the non-contiguous layer pruning case than in any of the contiguous layer pruning cases. Accordingly, in this example, noncontiguous layer pruning yields pruned weights that are in a better state for later fine-tuning to regain accuracy.

In some implementations, OSLP provides for a reduction in floating point operations (FLOPs) required for the CNN to generate an inference (e.g., process an image). For example, OSLP techniques prune fewer layers than typical WMP independent techniques, but perform well (e.g., comparably to WMP independent techniques) for higher pruning threshold values than those used in WMP independent techniques. Typical WMP independent techniques prune all convolutional layers, but are limited to lower pruning thresholds (i.e., they do not provide a performance increase at higher pruning thresholds). In some cases, by scaling to a higher pruning threshold, an OSLP approach achieves equal or better performance as compared to a typical WMP independent or greedy approach, even in cases where OSLP FLOPs reduction is less.

Figure 8:
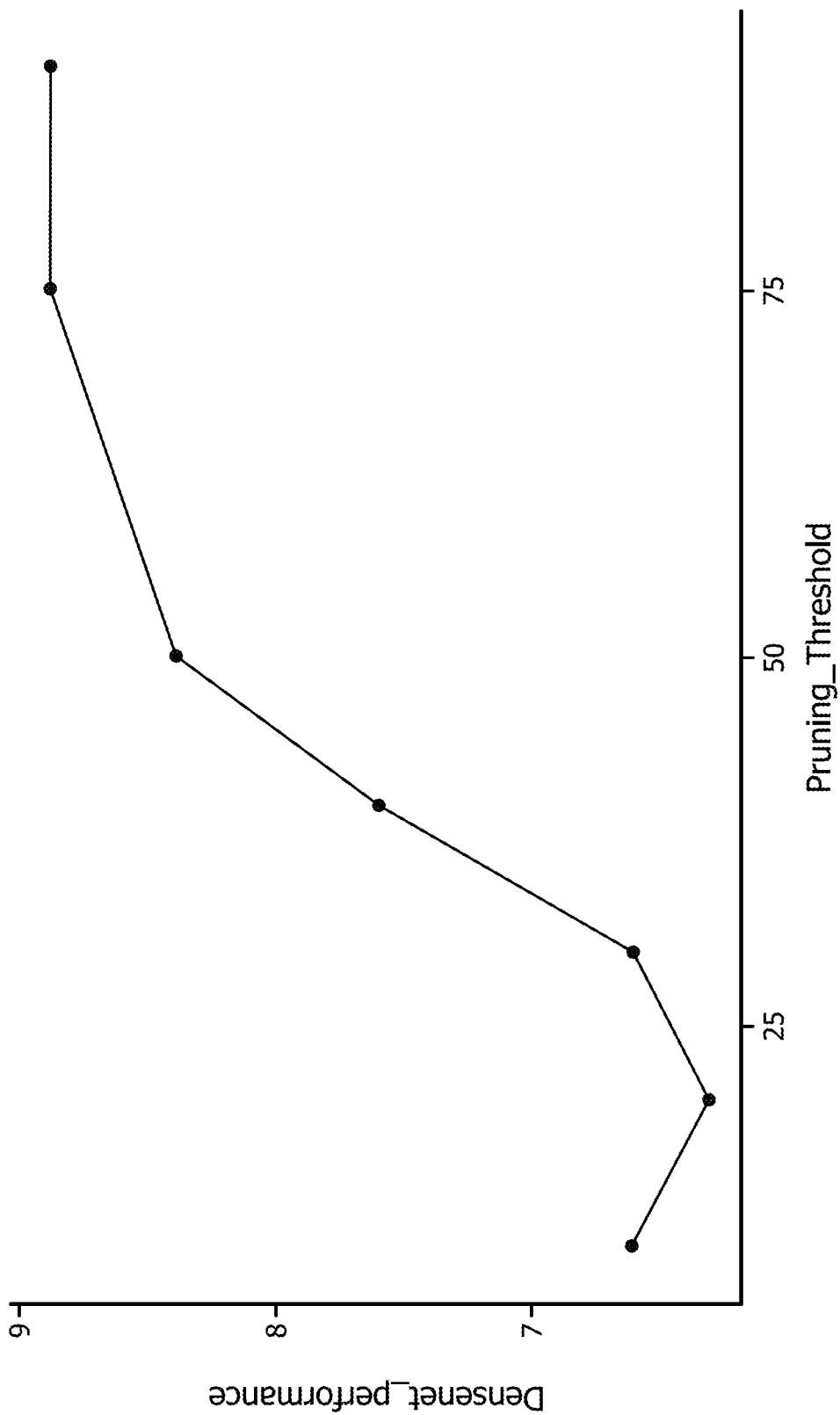
FIG. 8 is a graph illustrating throughput of an example CNN for different pruning thresholds.

FIG. 8 is a graph which plots throughput (expressed in images processed by the CNN per second) of an example CNN against different pruning thresholds. This example uses DenseNet121, which is a popular CNN model with 121 layers, however any suitable CNN model can be used. The graph of FIG. 8 suggests that some thresholds provide a greater improvement in performance than others. Accordingly, in some implementations, a correct choice of pruning threshold provides improved performance (e.g., throughput) gain. On the other hand, choosing an incorrect pruning threshold creates performance overhead in some cases.

In some implementations, OSLP yields a reduction in FLOPs similar to that of typical WMP methods. For example, Table 1 illustrates example FLOPs reduction in an example CNN model (VGGNet16) for both OSLP and typical WMP Independent filter pruning methods. In this example, a WMP Independent pruning of the first 10 convolutional layers is compared with OSLP pruning of first 5 convolutional skip layers (i.e., 1, 3, 5, 7, and 9). The values in Table 2 reflect that OSLP with a 50% pruning threshold can achieve FLOPs reduction that is comparable to WMP independent pruning with a 31% threshold in this example.

TABLE 2

| Layers | Original VGGNet16 (FLOPS) | WMP Independent @ 31% (FLOPS) | OSLP @ 50% (FLOPS) |
|---|---|---|---|
| Conv1 | 86704128 | 59609088 | 43352064 |
| Conv2 | 1849688064 | 874266624 | 924844032 |
| Conv3 | 924844032 | 437133312 | 462422016 |
| Conv4 | 1849688064 | 874266624 | 924844032 |
| Conv5 | 924844032 | 439617024 | 462422016 |
| Conv6 | 1849688064 | 884229696 | 924844032 |
| Conv7 | 1849688064 | 884229696 | 924844032 |
| Conv8 | 924844032 | 442114848 | 462422016 |
| Conv9 | 1849688064 | 884229696 | 462422016 |
| Conv10 | 1849688064 | 884229696 | 924844032 |
| Conv11 | 462422016 | 319721472 | 462422016 |
| Conv12 | 462422016 | 462422016 | 462422016 |
| Conv13 | 462422016 | 462422016 | 462422016 |
| Total | 15346630656 | 7908491776 | 7904526336 |

Equation 11 is used, in some implementations, to calculate an approximate OSLP pruning threshold ($T_{OSLP}$) based on a given WMP independent pruning threshold ($T_{WMPind}$). In Equation 12, N represents the number of layers in the CNN, $T_{WMPind}$ represents the threshold for Whole Model Pruning, $T_{OSLP}$ represents the (approximate) equivalent threshold for One Shot Pruning, sf represents the Skip Factor (i.e., number of convolutional layers skipped between pruned convolutional layers of the CNN), the variables i and j are used to step through layers of the CNN, and Flops[i] represents the number of FLOPs carried out by layer i. Given the foregoing, the equivalent pruning threshold for One-Shot Skip Layer Pruning can be approximated as:

$$T_{OSLP} = (1-(1-T_{WMPind})^2)(\Sigma_{i=1}^{n} \text{Flops}[i])/(\Sigma_{j=0}^{n/sf+1} \text{Flops}[j*(sf+1)+2]) \qquad \text{Eq. 11}$$

With skip Factor=1, the equation can be approximated by Equation 12:

$$T_{OSLP} = 1-(1-T_{WMPind})^2 \qquad \text{Eq. 12}$$

For example, in order to train a CNN using OSLP pruning to exhibit similar inference performance to a CNN trained to perform the same inference using WMP independent pruning, the WMP Independent pruning threshold (31% in this example) is applied in Equation 1 to yield an approximate OSLP pruning threshold (50% in this example). In some implementations, applying pruning threshold $T_{OSLP}$ to OSLP for a CNN yields a FLOPs reduction similar to WMP Independent pruning of the CNN with pruning threshold $T_{WMPind}$.

In some implementations, OSLP provides better error recovery during fine-tuning of a CNN after pruning, as compared with WMP independent pruning. For example, using WMP Independent pruning, pruning filters of a layer x induces channel and/or feature-map removal in the input of layer x+1 input, accumulating error in the CNN. Pruning filters of layer x+1 accumulates yet more error (i.e., in layer x+2), and so forth.

Due to the amount of error accumulated in the CNN after pruning, fine-tuning after the pruning may not be able to regain a level of accuracy of the CNN that is acceptably close to the original accuracy prior to pruning.

On the other hand, using OSLP pruning, the layer x+1 is skipped for filter pruning. This avoids further error accumulation, e.g., because it avoids pruning both channel inputs and channel outputs of the filters of a single layer. This also facilitates fine-tuning of the layer x+1 filters for the filter pruning done in layer x during the final retraining step.

The values in Table 3 empirically illustrate OSLP's error recovery for the example VGGNet16 image classification CNN model, as compared with continuous (i.e., non-skip layer), WMP independent pruning. In Table 3, loss is expressed as a scalar measure.

TABLE 3

CONVERGENCE OF SKIP AND CONTIGUOUS LAYERS

| Loss at Step | Skip Layer Pruning @ 50% threshold | Continuous Layer Pruning @ 31% threshold |
| --- | --- | --- |
| 1000 | 6.725 | 6.668 |
| 2000 | 6.468 | 6.456 |
| 3000 | 6.408 | 6.403 |
| 4000 | 6.373 | 6.376 |
| 5000 | 6.356 | 6.357 |
| 6000 | 6.338 | 6.342 |
| 7000 | 6.329 | 6.331 |
| 8000 | 6.315 | 6.325 |
| 9000 | 6.307 | 6.314 |
| 10000 | 6.296 | 6.302 |
| 11000 | 6.290 | 6.296 |
| 12000 | 6.285 | 6.292 |
| 13000 | 6.279 | 6.290 |
| 14000 | 6.275 | 6.286 |
| 15000 | 6.270 | 6.285 |
| 16000 | 6.269 | 6.278 |
| 17000 | 6.263 | 6.274 |
| 18000 | 6.262 | 6.272 |
| Epoch 1 Top1 Accuracy | 62.892 | 61.9 |

In some implementations, OSLP uses L2 norm ensembling as a pruning criterion for the scoring function in step 4 of the algorithm illustrated in Table 1. In this context, the L2 norm is the square root of the sum of squared vector values of a given filter. L2 norm ensembling entails calculating a weighted average of the L2 norm of the output of a filter in a first layer and the L2 norms of the inputs of one or more corresponding filters in the next successive layer in the CNN.

Using this method, the score of a filter in a layer x is determined by ensembling the L2-norm of the filter output with L2-norms of the inputs of its corresponding channels spread across filters of the next layer x+1.

Figure 9:
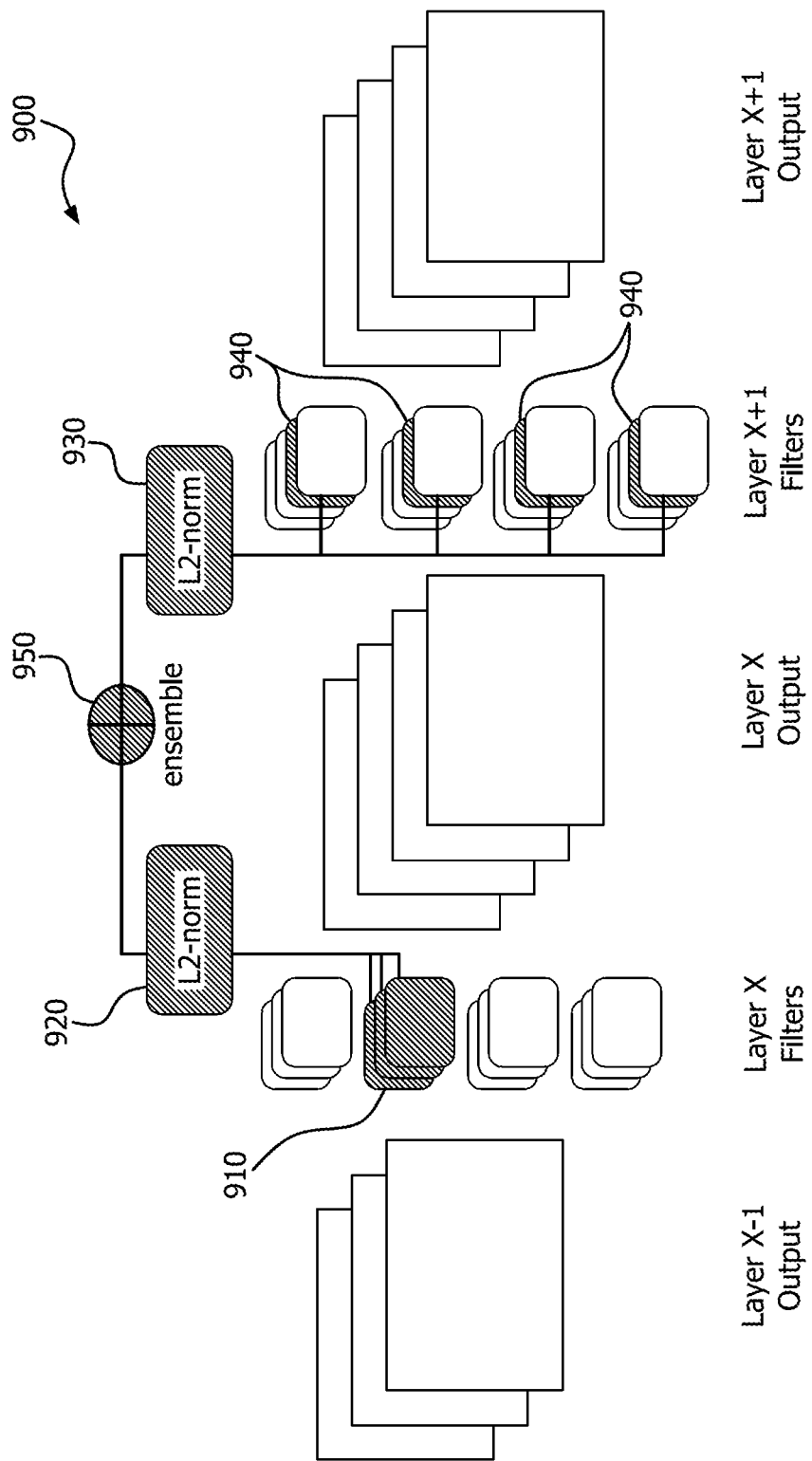
FIG. 9 is a block diagram illustrating example L2-norm ensembling.

FIG. 9 is a block diagram of an example CNN 900 which illustrates L2-norm ensembling to determine filter saliency. In this example, an L2 norm 920 of layer x filter 910 is calculated and ensembled in operation 950 with the L2-norm of each channel 940 in layer X+1 filters that corresponds to filter 910.

A saliency score of filter 910 is calculated based on the ensembling of L2-norms in operation 950 of FIG. 9. Saliency scores for all of the filters in layer X are calculated and ordered (in order of saliency), and a threshold number (based on the desired pruning threshold) of the least salient filters in layer X are removed.

In some implementations, determining filter L2-norms of the layer being pruned in this way tends to prune insignificant filters, and not to prune redundant filters. Ensembling L2-norms of the corresponding channels in the filters of the next layer combines decisions from two different sources to improve removal of both insignificant and redundant filters in a layer. Thus, in some implementations, identifying filter salience in this way provides better performance than the state-of-the-art methods. As discussed herein, the salience of a filter refers to how significant the filter is to the output of the layer, e.g., in terms of the relative amount to which the filter contributes to the output as compared with other filters (i.e., how salient the filter is to the output). Salience is quantified and/or presented as a salience score in some implementations.

Hyper-parameters are training parameters whose values are set prior to training, and are not derived during the training. Three hyper-parameters are identified for pruning and fine-tuning the model in OSLP methods. For ease of reference, these hyper-parameters are referred to as skip value 'S', pruning threshold 'T', and number of layers to be pruned 'n'.

The skip value S indicates the number of successive layers or modules to be skipped before pruning a layer. For example, in some relatively sparse CNN models, a skip value of 1 (e.g., pruning layers 1, 3, 5, etc.) performs well, whereas for some relatively dense CNN models, a skip value of 2 (e.g., pruning layers 1, 4, 7, etc.) converges faster. In some more dense models, higher skip values converge faster. In some implementations, the skip value is related to the sparsity or density of the CNN model.

The pruning threshold T indicates the number (expressed here as percentage) of filters in a layer that can be pruned away from the model without creating an unacceptable impact on the accuracy of the layer. In some implementations, OSLP performs relatively well for higher threshold values. Accordingly, some implementations use a T value of 50% (or approximately 50%) for both sparse and dense CNNs.

The number of layers to be pruned 'n' has a default value based on the hyper-parameter S in some implementations. For example, in some implementations, Equation 11 gives n, where N is the number of layers considered for pruning. In some implementations, n is selected to be lower than the default value in order to regain a higher level of accuracy.

$$n = N/(S+1) \qquad \text{Eq. 13}$$

Figure 10:
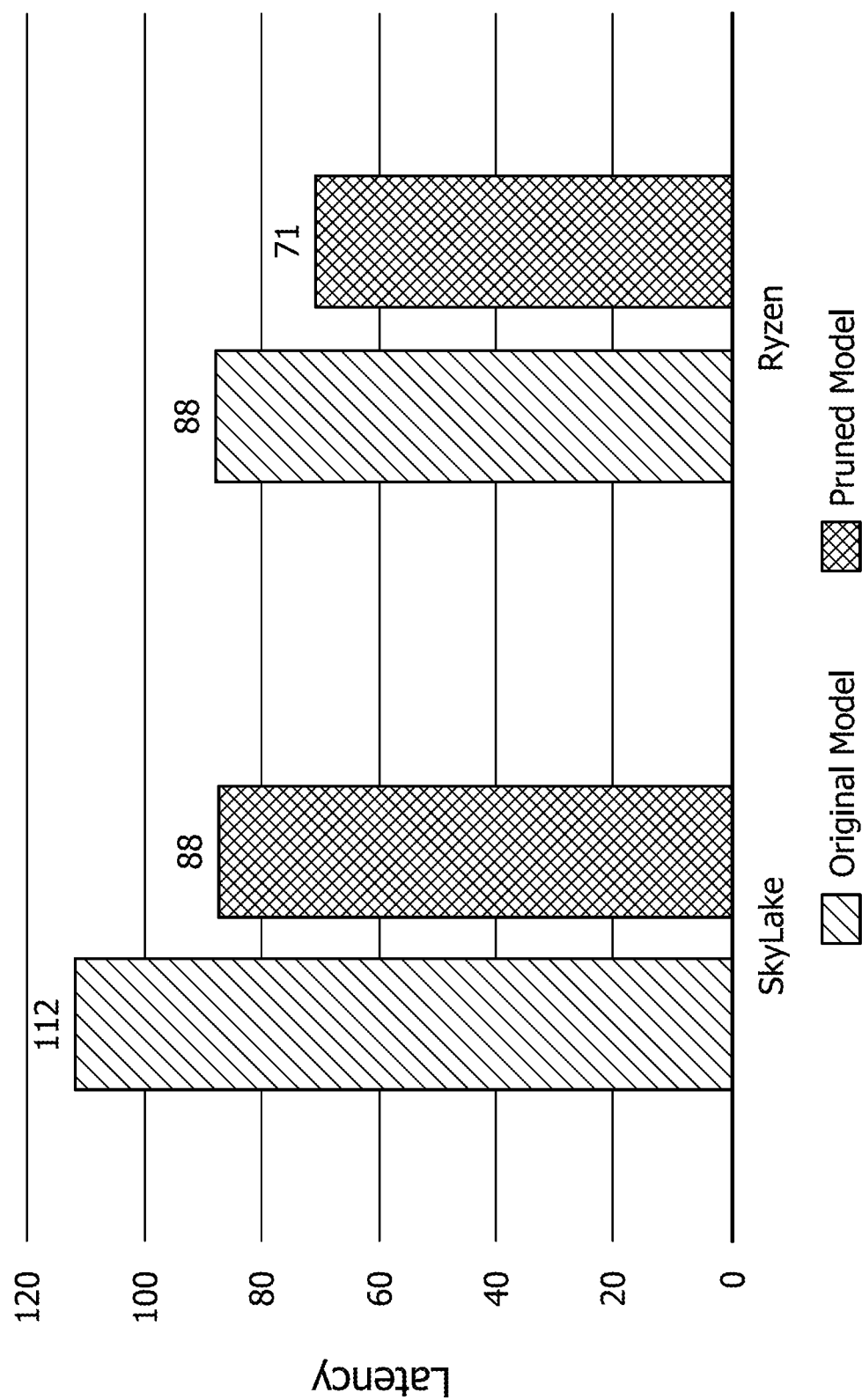
FIG. 10 is a bar graph comparing latency in example un-pruned and pruned CNN models.

FLOP reduction is often referenced as a metric for performance improvement (e.g., inference latency) of a trained CNN. It is noted however that in some implementations, FLOP reduction does not correlate directly to performance improvement. FIG. 10 is a bar graph which plots the latency of example original and pruned models of VGGnet16 using state-of-the-art whole model pruning. In these examples, a 5X improvement in FLOPs translates only to about a 30% gain in latency. These example evaluations are based on unoptimized TensorFlow executing on a Skylake processor, and Math Kernel Library (MKL) enabled TensorFlow executing on a Ryzen processor, respectively. TensorFlow is a CNN implementation framework provided by Google.

MKL is a software acceleration framework provided by Intel to improve the inference time of convolution calls in TensorFlow.

In some implementations, TensorFlow is used as a backend for both training and inference. In some implementations, an AMD Vega10 GPU is used for training. In some implementations, an AMD Ryzen CPU is used for inference. Table 4 illustrates further example hyper-parameters used for training.

TABLE 4

HYPER-PARAMETERS USED

| Hyperparameters | Value |
|---|---|
| Optimizer | Adam |
| Learning Rate | 0.0000015 |
| Batch Size | 64 |
| Momentum | 0.9 |

Learning rate is a hyper-parameter used to tune the speed at which a network converges in training. Batch size is a hyper-parameter used to indicate the number of images to be trained at one time for weight updates. Momentum is a hyper-parameter used to cause the CNN to tend to converge toward optimal values. Optimizer is a hyper-parameter used to express which optimization algorithm is used to train the CNN. Here, adaptive moment estimation ("Adam") is used as an example training algorithm, however any suitable optimization algorithm (e.g., stochastic gradient descent (SGD), root mean square propagation (RMSprop), etc.) is useable in other implementations. In some implementations, varying learning rate and batch size has an impact on training. Based on a comparison of different fixed and diminishing learning rates, and different batch sizes and optimizers, a learning rate of 0.0000015 and a batch size of 64, with an Adam optimizer, are optimal in some implementations.

In some implementations, all layers of the pruned model are fine-tuned. In some implementations, fine-tuning only the pruned layers (and not fine-tuning the layers for which the pruning is skipped) yields poorer convergence than fine-tuning all layers of the pruned model. In some implementations, a maximum of 10 epochs is used to fine-tune OSLP pruned models to regain accuracy of the CNN.

Some whole model independent pruning methods prune from shallower layers towards deeper layers (i.e., prune deeper layers after pruning shallower layers). In some implementations, if one relatively shallow layers is pruned at a relatively high threshold (e.g., 50%) and fine-tuned for a fixed number of epochs (e.g., a number of epochs q as discussed earlier), the regained accuracy of the CNN is better than if one of the relatively deeper layers is pruned. In some implementations, pruning shallow layers contributes more to FLOP reduction than pruning deeper layers. Accordingly, in some implementations, it is preferable to prune shallower layers.

Some whole model independent pruning methods prune 50% of filters in deeper convolution layers (e.g., 10, 11 and 12 of VGGnet16). In some implementations, error recovery is slow in such cases. For example, in some such cases, after 1 epoch of fine-tuning, top 5 accuracy is approximately 60%, as compared with an original accuracy of 90.04%. Top 5 accuracy refers to the accuracy of the CNN at a classification task, where the correct classification is found within (e.g., given the highest score by) the top 5 inferences of the trained CNN. This illustrates the general principle that deeper layers often have non redundant filters and are highly sensitive to pruning.

Some whole-model independent pruning methods include pruning a whole CNN with independent pruning. For example, in some implementations, by pruning the complete CNN with a threshold of 50%, if the whole network is pruned using independent pruning, the accuracy improves significantly (e.g., from nearly 0% to 50% after 1 epoch of fine-tuning.)

Some whole model independent pruning methods include pruning the first N convolutional layers, where N is less than the total number of convolutional layers in the CNN. For example, if the first 10 convolutional layers of a CNN are pruned using independent pruning and fine-tuned, the accuracy improves significantly (e.g. to about 75% in 1 epoch). This example illustrates that error recovery is faster in some implementations if the first N layers (e.g., 10 layers) are pruned instead of pruning all convolutional layers in the CNN.

Some whole model independent pruning methods include adjustments to improve the accuracy of pruned layers. For example, learning rates (e.g., fixed and diminishing), batch size, and optimizers, can be adjusted. For example, the combination of a learning rate of 0.0000012, batch size of 64, and the Adam optimizer is optimal in some implementations. These hyper-parameters are used for example only. For example, the Adam optimizer is one popular variant of a gradient descent technique for updating weights in the CNN, however other optimizers are usable in other implementations.

Figure 11:
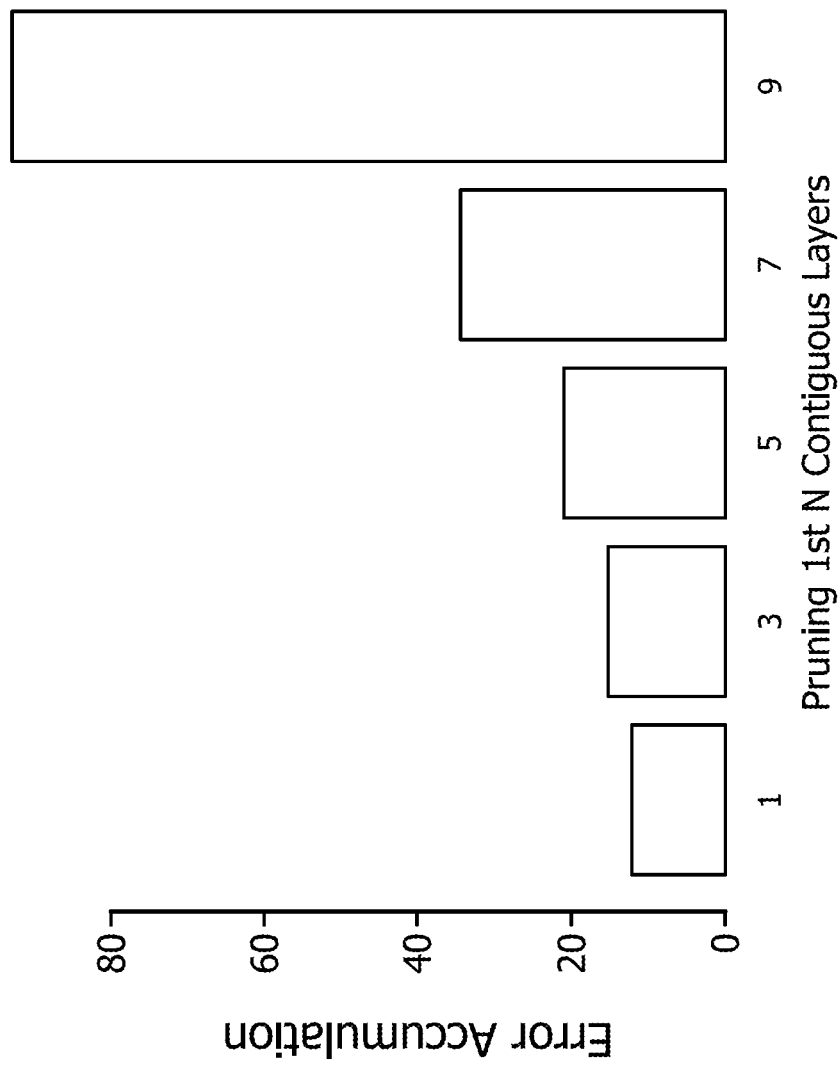
FIG. 11 is a bar graph illustrating accumulated error following example independent pruning at a fixed pruning threshold for an increasing number of contiguous convolutional layers.
Figure 12:
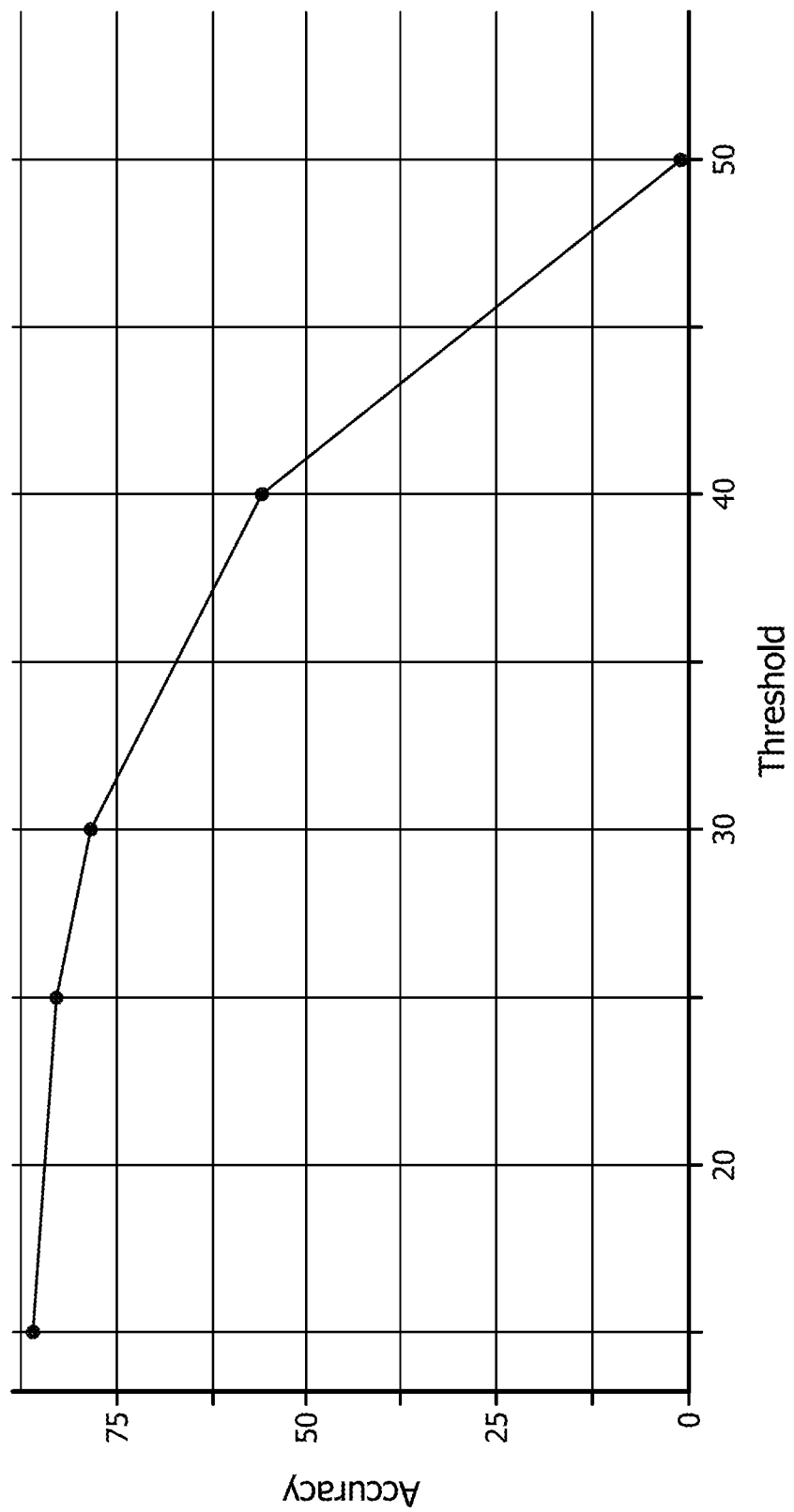
FIG. 12 is a line graph illustrating accumulated error following independent pruning at different pruning thresholds.

In FIGS. 11 and 12, error accumulation is analyzed with respect to number of layers pruned, and pruning thresholds, respectively, where the CNN is pruned using independent pruning, and the CNN is fine-tuned for 1 epoch with a subset of images.

FIG. 11 is a bar graph illustrating accumulated error following independent pruning at a fixed pruning threshold for an increasing number of contiguous convolutional layers. In this example, the first 10 convolutional layers of VGGnet16 are pruned at a fixed pruning threshold of 50%. As can be seen in the graph, accumulated error increases non-linearly with the increase in layers.

FIG. 12 is a line graph illustrating accumulated error following independent pruning at different pruning thresholds. In this example, the first 10 convolutional layers of VGGnet16 are pruned at various thresholds. As can be seen in the graph, accumulated error increases non-linearly with the increase in pruning threshold, with convergence becoming very slow at a threshold of 50%.

The analyses in FIGS. 8 and 9 illustrate that independent pruning is effective at lower thresholds, and works well in some implementations without the need for training samples or stronger algorithms.

Figure 13:
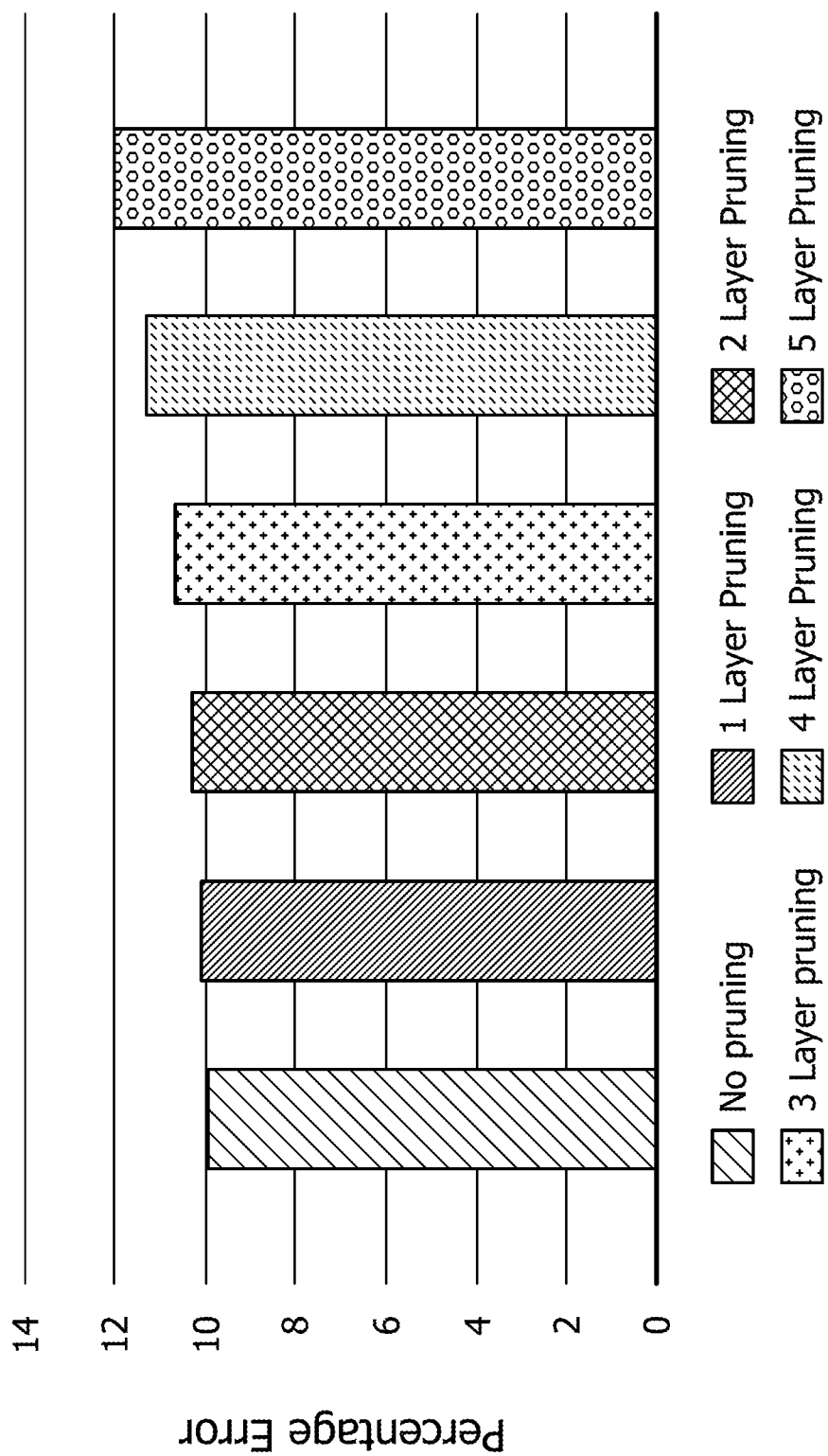
FIG. 13 is a bar graph illustrating accumulated error following OSLP pruning at a fixed pruning threshold for an increasing number of non-contiguous convolutional layers.

FIG. 13 is a bar graph illustrating accumulated error following OSLP pruning at a fixed pruning threshold by showing percentage error for each of an increasing number of non-contiguous convolutional layers. In this example, skip layers of the first 10 convolutional layers of VGGnet16 are pruned (i.e., 5 layers—1, 3, 5, 7, and 9) at a fixed pruning threshold of 50%, based on fine-tuning for several epochs on a subset of ImageNet Training datasets with fixed hyper-parameters. Skipping one convolutional layer between each pruned convolutional layer is referred to for convenience as OSLP with a skip factor of 1. Similarly, skipping two convolutional layers between each pruned convolutional layer is referred to as a skip factor of 2, and so forth. As can be seen in the graph, accumulated error increases less dramatically in the OSLP case than in the contiguous layer pruning case illustrated in FIG. 11.

Figure 14:
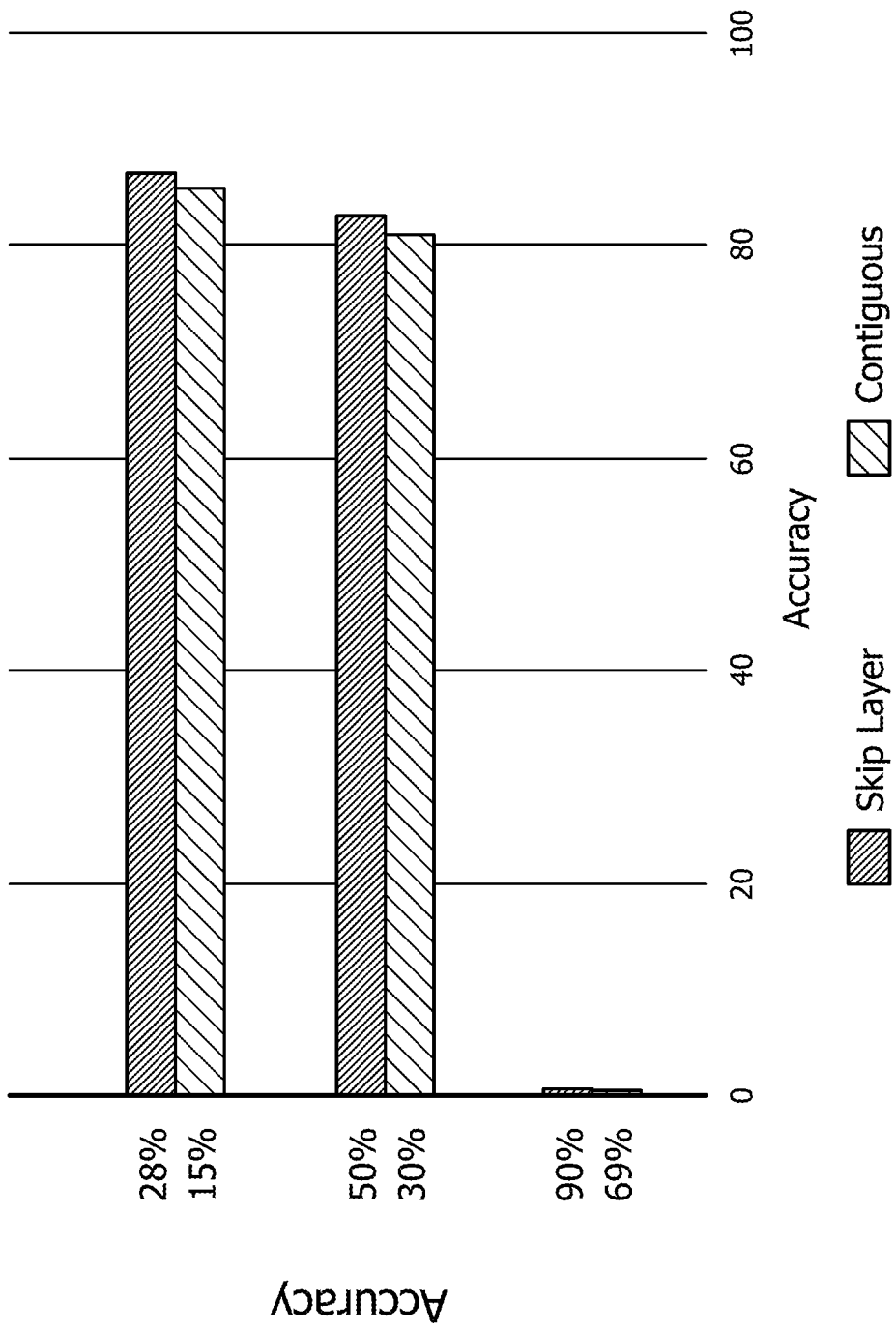
FIG. 14 is a bar graph illustrating example error recovery for different pruning thresholds.

However, error recovery is much faster when OSLP pruning is used as shown in FIG. 14. For example, FIG. 14 illustrates that for a pruning threshold of 15% using continuous layers and a pruning threshold of 28% using OSLP (with a skip factor of 1) for an approximately equal number of FLOPS (as given by $T_{OSLP}=1-(1-T_{WMPind})^2$—see Eq. 12) yields slightly better accuracy in the OSLP case than in the continuous layer pruning case. Similarly, this is also true when comparing continuous layer pruning and OSLP for pruning thresholds of 30% and 50% respectively, and for pruning thresholds of 50% and 90% respectively. Some implementations use OSLP to prune deep CNN models (e.g., CNN models having a relatively larger number of layers.) DenseNet is an example of a deep model, however the advantages of OSLP pruning generalize to other deep networks.

The architecture of DenseNet includes a convolution layer, pooling layer, dense block layer, transition block layer, and a classification layer. For example, the convolution layer of DenseNet performs 7*7 convolution on an input image. The 7*7 convolution is followed by the pooling layer, which reduces the spatial dimensions of the output of the convolution layer.

The dense block layer includes number of 1*1 convolution filters (a first layer of the dense block) followed by a number of 3*3 convolution filters (a second layer of the dense block). Each of the convolution layers of the dense block is followed by batch normalization.

The transition block layer compresses the image, and is followed by a classification layer which performs global average pooling for classification. A growth rate hyperparameter, k, controls the rate at which the channels grow during training. For example, in some implementations, k controls the increase in the number of filters in a block x+1 as compared to the preceding block x.

Each dense block includes two layers (i.e., 1×1 convolution, and 3×3 convolution) as mentioned above. Each dense block has connections to several other dense blocks. Accordingly, in some implementations, entire individual dense blocks are pruned. Because DenseNet models are very dense, in some implementations, alternate layers of each of the dense blocks are pruned (e.g., motivated by the same reasoning as the skip layer pruning approach discussed above).

In some implementations, for each dense block in the CNN, the 1*1 convolution layer of the dense block is pruned (e.g., with a pruning threshold of 50%). Because the output channel of a layer i becomes the input channel or channels of a layer i+1, removing filters (e.g., 50%) in the 1*1 convolution layer removes input channels (e.g., 50%) in the succeeding 3*3 convolution layer of the dense block. In some implementations, this achieves 2X acceleration. In some implementations where alternate dense layers are pruned, 50% FLOP reduction is achieved.

After the alternate DenseNet layers are pruned, the model is fine-tuned (e.g., for a few epochs) using the hyperparameters in Table 5A. The accuracy of the retraining results for 1 epoch and 2 epochs of fine-tuning of the CNN is reflected in Table 5B.

TABLE 5

SKIP LAYER PRUNING
OF DENSENET121

| Hyperparameters | Value |
| --- | --- |
| Learning Rate | 0.0000015 |
| Batch Size | 64 |
| Optimizer | Adam |
| Momentum | 0.9 |

| Epochs | Accuracy |
| --- | --- |
| 1 | 89.98 |
| 2 | 91.08 |

(a) Choice of Hyper-parameters
(b) Retraining Results

Table 5b reflects the accuracy improvement over 1 and 2 epochs achieved by fine-tuning the pruned DenseNet network through extending the idea of a skip layer to a "skip block," and using an L2 norm as a criterion for pruning.

Some implementations use OSLP to prune sparse CNN models (e.g., CNN models that include a relatively larger number of redundant and/or insignificantly contributing filters (i.e., that are less salient) in each of its layers. A CNN where layers only connect to adjacent layers is an example of a sparsely connected network. VGGnet16 is an example of a sparse CNN model.) For example, if the first 10 consecutive layers of VGGnet16 model are pruned at a threshold of 50% and whole model pruning is applied using L1 norm to sort the filters by salience, the overall top 5 accuracy (i.e., accuracy of the top 5 predictions) of the pruned model after 5 epochs of fine-tuning is less than 80%.

On the other hand, if a subset of convolutional layers (e.g., 5) of the first 10 convolutional layers are pruned, followed by fine-tuning (e.g., 5 epochs), accuracy improves as information loss reduces. For example, by randomly choosing 5 layers with a constraint of choosing at least 2 contiguous layers, an accuracy of 86.6% is obtainable in some implementations.

If 5 non-contiguous convolutional layers are selected from the first 10 convolutional layers of VGGnet are selected for pruning, the accuracy is better than 86.6% in some implementations, e.g., because information loss happens either with channel inputs or channel outputs, but not both. For example, if the first 5 odd convolutional layers of VGGnet are pruned at a pruning threshold of 50%, after 5 epochs of retraining, the accuracy is about 87.8% in some implementations. This supports the principle that if either input or output channels of a layer (but not both) are pruned, accuracy after fine-tuning is better in some implementations as compared to pruning both input and output channels. By increasing the number of fine-tuning epochs to 10 the accuracy improves to about 88.4% in some implementations.

It is observed that improvement in FLOPs does not translate to equivalent improvement in performance. Modern CNN accelerators like MKLDNN perform best when the number of channels is power of 2 and greater than or equal to 8. This may hold true with other modern CNN accelerators too.

Figure 15:
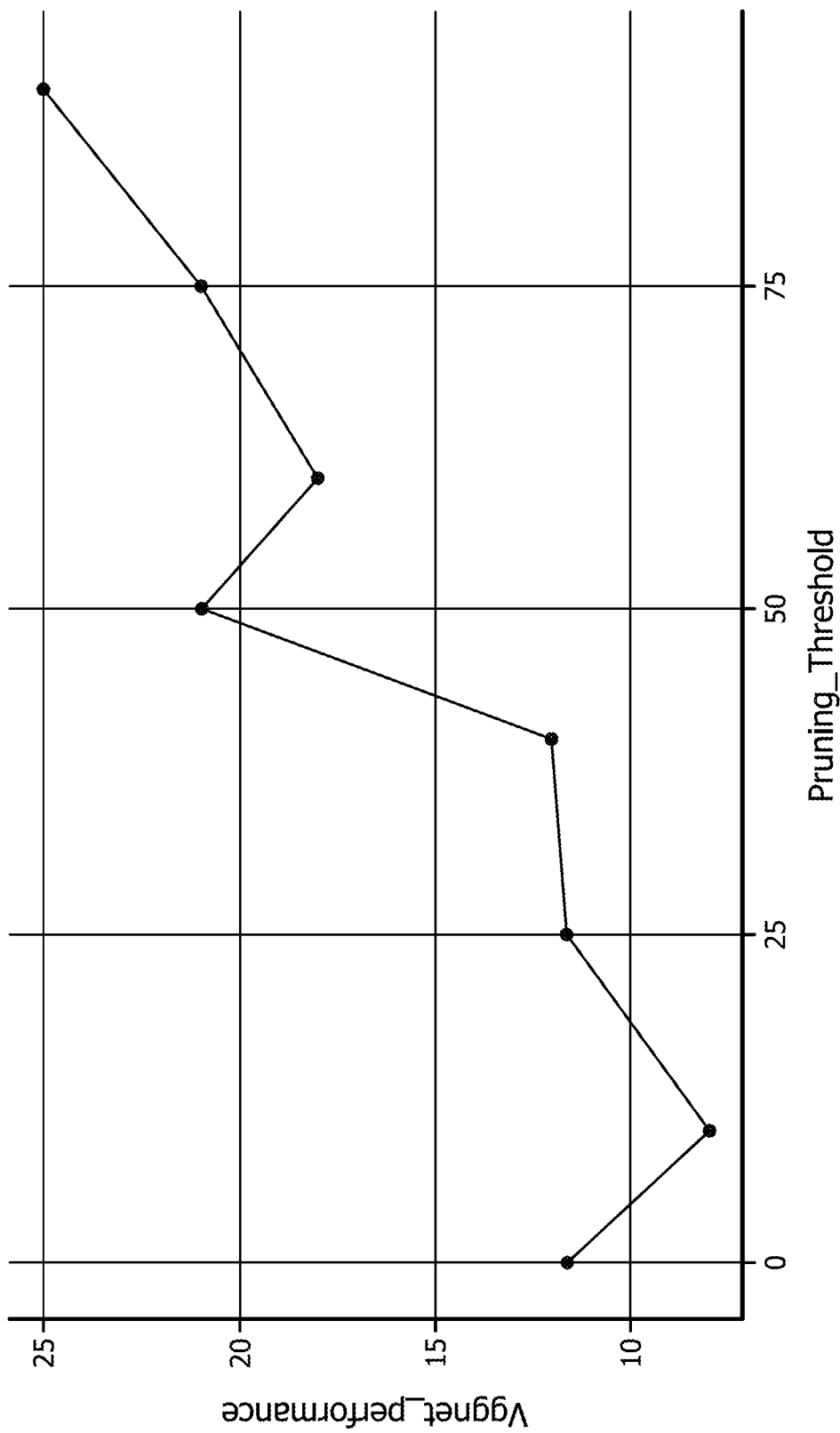
FIG. 15 is a line graph illustrating example performance for different pruning thresholds.
Figure 16:
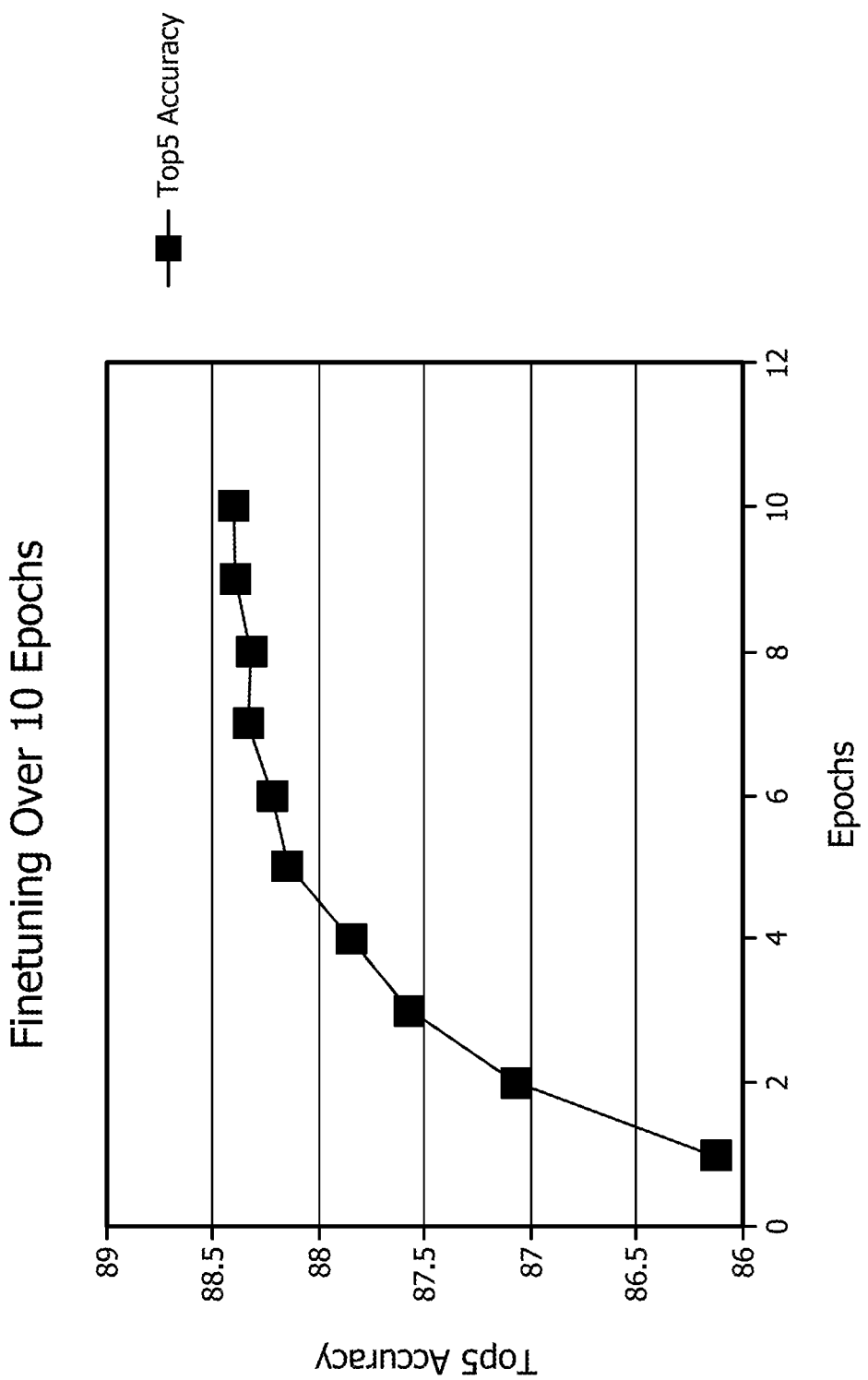
FIG. 16 is a line graph which illustrates example accuracy improvement of odd layer pruning.

FIG. 15 is a line graph which illustrates example performance (expressed as inference time in milliseconds) of VGGnet16, for different pruning thresholds (expressed as percentage pruned). The graph illustrates the impact of the correct choice of pruning threshold on performance. For example, a choice of 50% threshold improves the performance significantly in this example. While sensitivity analysis is important for whole model pruning in some cases, an appropriate pruning threshold has a significant impact on performance. FIG. 16 is a line graph which illustrates the accuracy improvement of odd layer pruning over 10 epochs with a pruning threshold of 50%

By using the appropriate pruning threshold for performance, and using skip layers for faster convergence, some implementations achieve performance comparable to state-of-the art whole model pruning techniques, while being easier to implement.

In some implementations, pruning either channel inputs or channel outputs of a layer (e.g., by OSLP) achieves faster convergence than pruning channel inputs and channel outputs of a layer.

In some implementations, software frameworks can be efficiently leveraged for performance by choosing an appropriate threshold when OSLP is used. In some implementations, OSLP without sensitivity analysis still achieves performance results comparable to state-of-the-art whole model pruning techniques on CPUs, if the appropriate pruning threshold is chosen for performance. In some implementations, the concept of skip layers can be extended to skip blocks in modern CNN models, such as DenseNet. In some implementations, by not requiring multiple error recoveries and sensitivity analysis, OSLP is easier to implement and scale to deeper networks than some other approaches.

Figure 17:
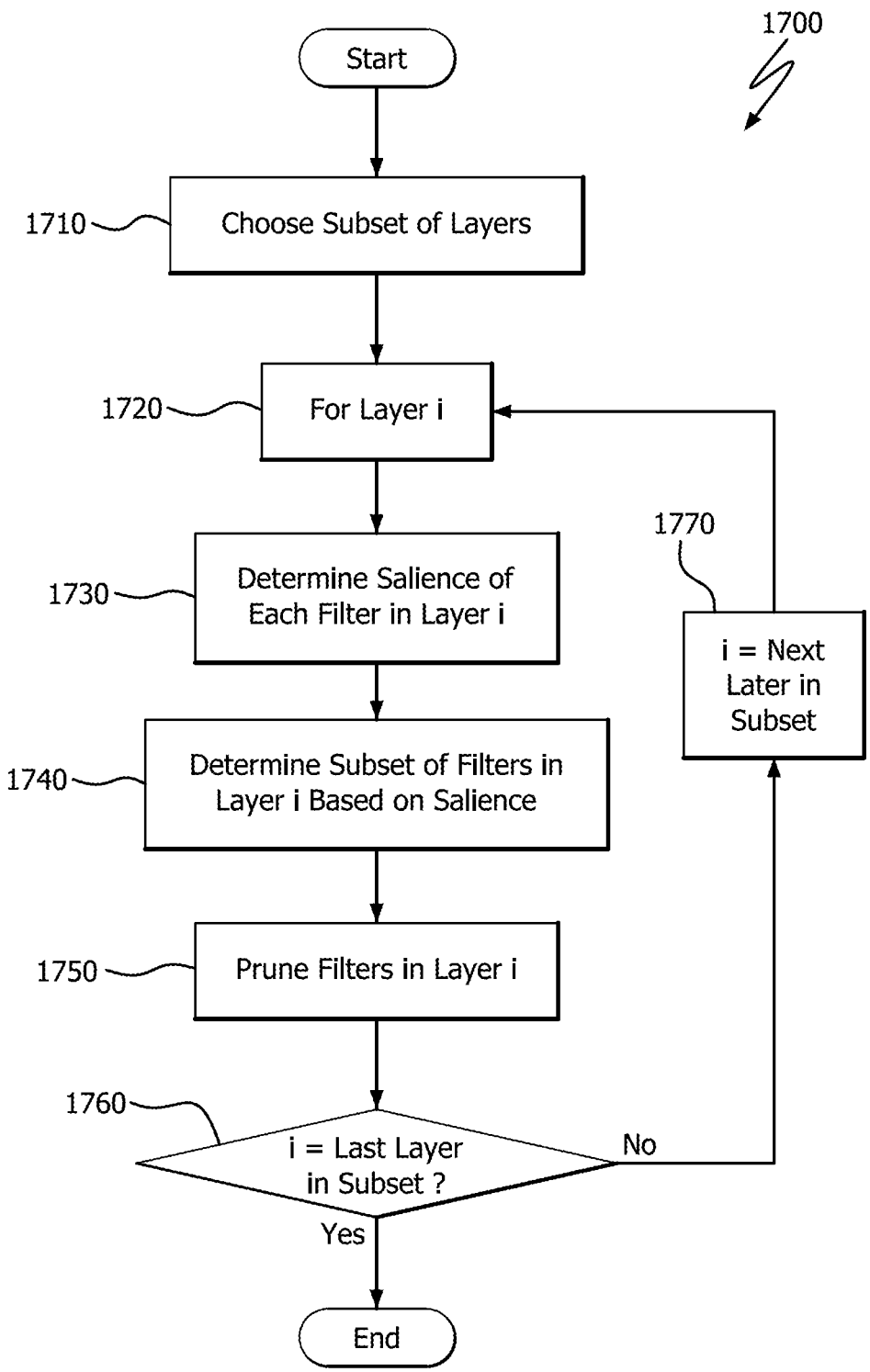
FIG. 17 is a flow chart illustrating an example method for OSLP.

FIG. 17 is a flow chart illustrating an example method for OSLP. In step 1710, a subset of the layers of the CNN is chosen according to the OSLP techniques discussed herein. For example, in some implementations, the subset of layers includes every other convolutional layer of the CNN, or includes non-contiguous convolutional layers of the CNN. The first layer of the subset of layers (indicated as layer i in the figure) is considered in step 1720, and the salience of each filter in layer i is determined in step 1730. The salience is determined in any suitable manner, such as by using techniques discussed herein. For example, in some implementations, a salience score is assigned to each filter based on its contribution to the output of the layer i, or its output to the CNN, and the like.

In step 1740, a subset of the filters in layer i is determined for pruning. The subset is determined in any suitable manner, such as by using techniques discussed herein. For example, in some implementations, those filters having the lowest salience scores are selected for the subset, and the subset is a percentage of the total number of filters in the layer which is based on a pruning threshold. In some examples, the pruning threshold is 50%.

In step 1750, the subset of the filters in layer i is pruned. In some implementations, the weights of the pruned layer i are re-initialized in an error recovery phase following the pruning. On a condition 1760 that layer i is the last layer in the subset of layers, the CNN is considered pruned. Otherwise, the next layer in the subset of layers is pruned. This is represented for ease of description by proceeding to step 1770 to increase the value of i to the next convolutional layer in the subset, and continuing through the process from step 1720 using the new value of i. It is noted however that any suitable method for looping through the process is usable in other implementations.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for pruning an artificial neural network (ANN) that includes a plurality of layers, the method comprising: pruning filters in each layer of a subset of layers of the ANN, the subset of layers including fewer layers than the plurality of layers of the ANN, and wherein the layers of the subset of layers are non-contiguous.

2. The method of claim 1, wherein the subset of layers comprises odd numbered layers of the ANN and excludes even numbered layers of the ANN.

3. The method of claim 1, wherein the subset of layers comprises even numbered layers of the ANN and excludes odd numbered layers of the ANN.

4. The method of claim 1, wherein the subset of layers comprises a first layer of the ANN and a second layer of the ANN which is a stride number of layers apart from the first layer of the ANN.

5. The method of claim 1, further comprising selecting the pruned filters in each layer of the subset of layers of the ANN for pruning based on a salience of each filter in its layer to an output of the ANN, wherein the salience is based on L2-norm ensembling.

6. The method of claim 1, wherein the pruned filters in each layer are determined, based on a salience of each filter in its layer to an output of the ANN, by selecting filters of lowest salience based on a pruning threshold.

7. The method of claim 6, wherein the pruning threshold comprises a pruning threshold percent ($T_{OSLP}$) that is based on a given whole model pruning (WMP) independent pruning threshold ($T_{WMPind}$).

8. The method of claim 6, wherein the pruning threshold is greater than a corresponding whole model pruning (WMP) independent pruning threshold ($T_{WMPind}$).

9. The method of claim 5, wherein the salience of each filter in its layer to an output of the ANN comprises a salience to an output of the layer of that filter.

10. A computing device configured to prune an artificial neural network (ANN) that includes a plurality of layers, the computing device comprising:
 circuitry configured to prune filters in each layer of a subset of layers of the ANN, the subset of layers including fewer layers than the plurality of layers of the ANN, and wherein the layers of the subset of layers are non-contiguous.

11. The computing device of claim 10, wherein the subset of layers comprises odd numbered layers of the ANN and excludes even numbered layers of the ANN.

12. The computing device of claim 10, wherein the subset of layers comprises even numbered layers of the ANN and excludes odd numbered layers of the ANN.

13. The computing device of claim 10, wherein the subset of layers comprises a first layer of the ANN and a second layer of the ANN which is a stride number of layers apart from the first layer of the ANN.

14. The computing device of claim 10, wherein the pruned filters in each filter of the subset of layers of the ANN are selected for pruning based on a salience of each filter in its layer to an output of the ANN, wherein the salience is based on L2-norm ensembling.

15. The computing device of claim 14, wherein the salience of each filter in its layer to an output of the ANN comprises a salience to an output of the layer of that filter.

16. The computing device of claim 10, wherein the pruned filters in each layer are determined, based on a salience of each filter in its layer to an output of the ANN, by selecting filters of lowest salience based on a pruning threshold.

17. The computing device of claim 16, wherein the pruning threshold comprises a pruning threshold percent ($T_{OSLP}$) that is calculated based on a given whole model pruning (WMP) independent pruning threshold ($T_{WMPind}$).

18. The computing device of claim 16, wherein the pruning threshold is greater than a corresponding whole model pruning (WMP) independent pruning threshold ($T_{WMPind}$).

* * * * *